(12) United States Patent
Okabayashi et al.

(10) Patent No.: US 11,411,408 B2
(45) Date of Patent: Aug. 9, 2022

(54) CHARGING SYSTEM, BATTERY PACK, AND CHARGER

(71) Applicant: MAKITA CORPORATION, Anjo (JP)

(72) Inventors: Hisakazu Okabayashi, Anjo (JP); Yoshihiro Ishikawa, Anjo (JP)

(73) Assignee: MAKITA CORPORATION, Anjo (JP)

( * ) Notice: Subject to any disclaimer, the term of this patent is extended or adjusted under 35 U.S.C. 154(b) by 215 days.

(21) Appl. No.: 16/713,313

(22) Filed: Dec. 13, 2019

(65) Prior Publication Data
US 2020/0203968 A1    Jun. 25, 2020

(30) Foreign Application Priority Data
Dec. 25, 2018    (JP) ............................. JP2018-241254

(51) Int. Cl.
*H02J 7/00*    (2006.01)

(52) U.S. Cl.
CPC ........ *H02J 7/00036* (2020.01); *H02J 7/0031* (2013.01); *H02J 7/00304* (2020.01); *H02J 7/00306* (2020.01); *H02J 7/00309* (2020.01); *H02J 7/00714* (2020.01); *H02J 7/007182* (2020.01); *H02J 7/007194* (2020.01)

(58) Field of Classification Search
USPC ......................................... 320/134–136, 137
See application file for complete search history.

(56) References Cited

U.S. PATENT DOCUMENTS

| 2003/0114899 | A1* | 6/2003 | Woods | A61N 1/3787 607/43 |
| 2005/0073282 | A1* | 4/2005 | Carrier | B25F 5/00 320/106 |
| 2010/0085020 | A1* | 4/2010 | Suzuki | H01M 10/4207 320/157 |
| 2012/0032639 | A1* | 2/2012 | Kim | H02J 7/005 320/112 |
| 2012/0139482 | A1* | 6/2012 | Zhang | H02J 7/0091 320/153 |
| 2013/0033790 | A1* | 2/2013 | Kobayakawa | G01K 7/42 361/87 |
| 2013/0285600 | A1 | 10/2013 | Ishikawa et al. | |
| 2014/0019074 | A1* | 1/2014 | Noda | G01R 31/3648 702/63 |
| 2014/0181167 | A1* | 6/2014 | Noda | G06F 7/58 708/250 |

(Continued)

FOREIGN PATENT DOCUMENTS

JP    5576264 B2    8/2014

*Primary Examiner* — Samuel Berhanu
(74) *Attorney, Agent, or Firm* — Oliff PLC

(57) ABSTRACT

A charging system in one aspect of the present disclosure includes a battery pack and a charger. The battery pack includes a battery and an information output circuit. The information output circuit outputs faulty state information in response to receiving a faulty state information request. The faulty state information indicates that the battery pack is in a first faulty state. The charger includes a charging power generation circuit, a charging control circuit, and a reception circuit. The charging control circuit transmits the faulty state information request. The reception circuit receives the faulty state information.

4 Claims, 9 Drawing Sheets

(56) References Cited

U.S. PATENT DOCUMENTS

| | | | |
|---|---|---|---|
| 2014/0266071 A1* | 9/2014 | Tomiyasu | H02J 7/007192 |
| | | | 320/150 |
| 2014/0334270 A1* | 11/2014 | Kusakawa | B25B 23/14 |
| | | | 368/9 |
| 2017/0021736 A1* | 1/2017 | Yuan | H02J 7/0029 |

\* cited by examiner

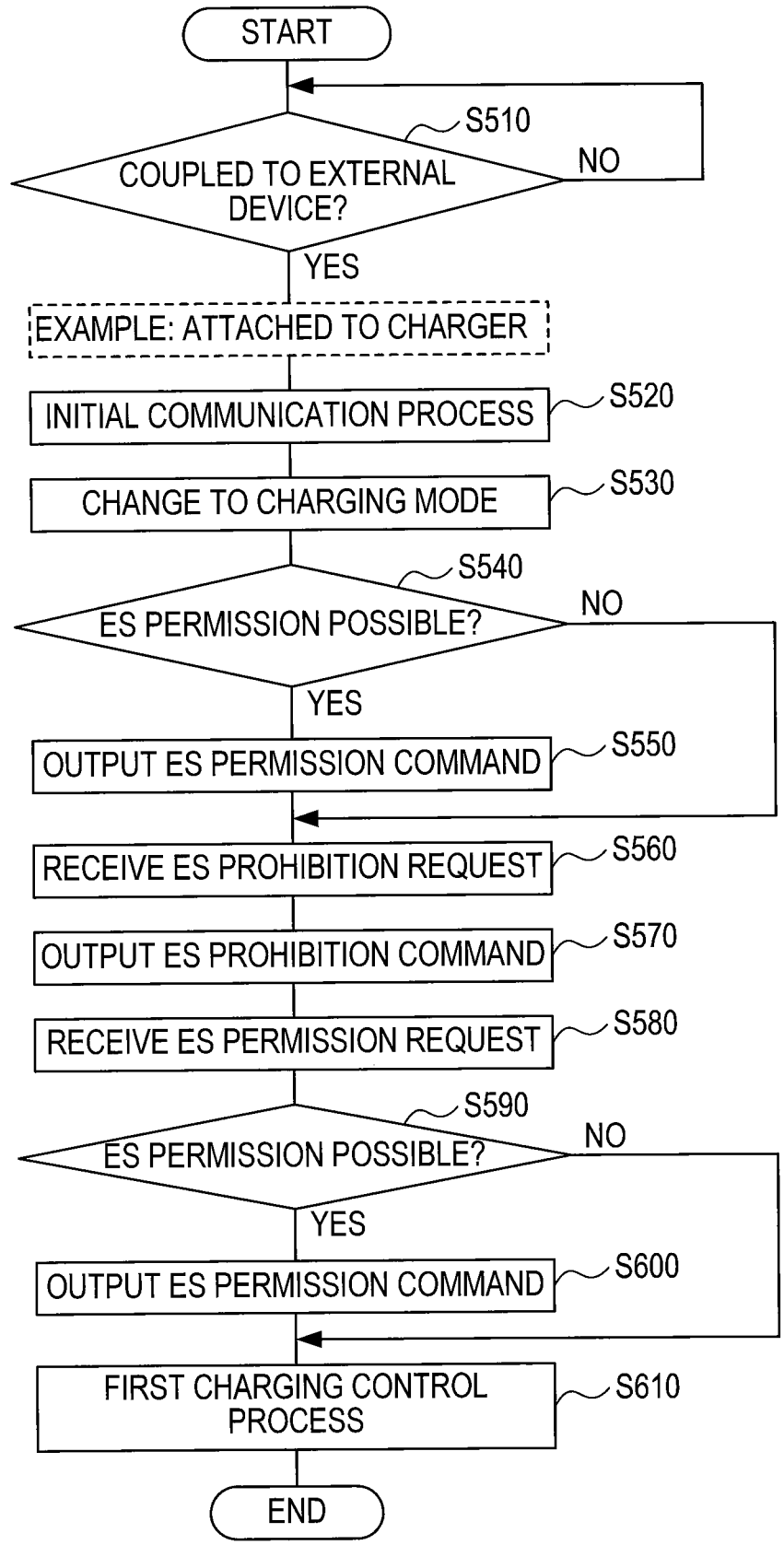

CHARGING SYSTEM, BATTERY PACK, AND CHARGER

CROSS-REFERENCE TO RELATED APPLICATIONS

The present application claims the benefit of Japanese Patent Application No. 2018-241254 filed on Dec. 25, 2018 with the Japan Patent Office, the entire disclosure of which is incorporated herein by reference.

BACKGROUND

The present disclosure relates to a technique of charging a battery.

Japanese Patent No. 5576264 discloses a charger for charging a battery. The charger performs a self-diagnosis to confirm whether the charger operates normally before starting charging a battery.

SUMMARY

In a case where a battery pack is charged by a charger in which a malfunction is present, the battery pack may not be charged properly. In addition, the charger and/or the battery pack may fail. Thus, improved reliability of a charger is required.

In one aspect of the present disclosure, it is preferable to provide a charger with improved reliability.

A charging system in one aspect of the present disclosure includes a battery pack. The battery pack is configured to be detachably attached to an electric working machine. The battery pack is configured to supply electric power to the electric working machine. The charging system includes a charger. The charger is configured such that the battery pack is detachably attached to the charger. The charger is configured to supply charging power to the battery pack.

The battery pack includes a battery. The battery is configured to be charged with the charging power. The battery pack includes an information output circuit. The information output circuit is configured to output faulty state (e.g., failure, or defect, or fault, or improper state, or abnormal state, or malfunction) information in response to the battery pack being in a first faulty state. The information output circuit is configured to output the faulty state information in response to (i) the battery pack not being in the first faulty state and also (ii) the information output circuit receiving a faulty state information request. The faulty state information indicates that the battery pack is in the first faulty state. The faulty state information request requests the battery pack to output the faulty state information.

The charger includes a charging power generation circuit configured to generate the charging power. The charger includes a charging control circuit configured to transmit the faulty state information request. The charger includes a reception circuit configured to receive the faulty state information.

The information output circuit may be configured to output non-faulty state (e.g., adequacy, or correctness, or completion, or proper state, or normal state, or perfection) information in response to the battery pack not being in the first faulty state. The non-faulty state information may indicate that the battery pack is not in the first faulty state.

The reception circuit may be further configured to receive the non-faulty state information.

The charging control circuit may be configured to transmit the faulty state information request in response to the reception circuit receiving the non-faulty state information. The charging control circuit may transmit the faulty state information request at the same time when the reception circuit receives the non-faulty state information. The charging control circuit may transmit the faulty state information request at any time point after the reception circuit receives the non-faulty state information. The information output circuit may keep outputting the non-faulty state information, while the battery pack is not in the first faulty state. In this case, the charging control circuit may transmit the faulty state information request at any time point, while continuously receiving the non-faulty state information.

The charger may further include a functional circuit separately provided from the charging control circuit. The functional circuit may be configured to perform a first function in response to the reception circuit receiving the non-faulty state information. The functional circuit may be configured to perform a second function in response to the reception circuit receiving the faulty state information.

The first function may include permitting output of the charging power to the battery pack. The second function may include inhibiting output of the charging power to the battery pack.

The charging control circuit may be configured to execute an faulty state information request process. The faulty state information request process may include a process of transmitting the faulty state information request.

The charging control circuit may be configured to execute an operation information acquisition process. The operation information acquisition process may include a process of acquiring operation information in response to the reception circuit receiving the faulty state information. The faulty state information acquired in the operation information acquisition process may be transmitted from the battery pack in response to the faulty state information request process. The operation information may indicate an operation state of the functional circuit.

The charging control circuit may be configured to execute a first diagnosis process. The first diagnosis process may include a process of diagnosing whether the functional circuit operates properly, based on the operation information acquired in the operation information acquisition process.

In the above-described charging system, the charger performs a diagnosis of whether the functional circuit operates properly in association with the battery pack. Specifically, the charging control circuit intentionally causes the battery pack to output the faulty state information. In response to receiving the faulty state information request, the information output circuit outputs the faulty state information even if the battery pack is not in a first faulty state. The charging control circuit determines whether the functional circuit operates properly in response to receiving the faulty state information. This enables providing a charger with an improved reliability.

The charging control circuit may determine in the first diagnosis process that the functional circuit operates properly (for example, the second function is performed properly), for example, in a case where output of the charging power to the battery pack is inhibited.

The functional circuit may be configured to perform the first function and/or the second function through hardware processing (that is, through a hardware system or a hard-wired system) instead of software processing (that is, a software system). The functional circuit may be configured, for example, to receive a control signal and to output the charging power to the battery pack based on the control signal. The functional circuit may be configured, for example, to stop output of the charging power based on the control signal. The functional circuit may be further configured to disable the control signal to thereby forcibly inhibit output of the charging power to the battery pack in response to input of the faulty state information from the battery pack.

The charging control circuit may be further configured to execute a faulty state information confirmation process. The faulty state information confirmation process may include a process of determining whether the reception circuit has received the faulty state information transmitted in response to the faulty state information request process.

The charging control circuit may be further configured to execute a communication error process in response to a determination that the reception circuit has not received the faulty state information in the faulty state information confirmation process.

The charging control circuit may be further configured to execute a second diagnosis process in response to the reception circuit receiving the non-faulty state information. The second diagnosis process may include a process of diagnosing whether a third function is properly performed in the charger. The charging control circuit may execute the second diagnosis process at any time point after the reception circuit receives the non-faulty state information In the above-described charging system, the charger can diagnose whether the charger operates properly in a case where the non-faulty state information is inputted to the charger. Also, the charger can diagnose whether the charger operates properly in a case where the information is inputted to the charger. Thus, a further improved reliability of the charger can be achieved.

The charging control circuit may be further configured to execute a removing request process. The removing request process may include a process of transmitting a removing request to the battery pack in response to execution of the operation information acquisition process by the charging control circuit. The information output circuit may be configured to output the non-faulty state information in response to receiving the removing request by the battery pack that is not in the first faulty state. The charging control circuit may transmit the removing request at any time point in the removing request process after the charging control circuit executes the operation information acquisition process.

In the above-described charging system, the charger can intentionally cause the battery pack to output the faulty state information by the faulty state information request, and thereafter can easily stop output of the faulty state information from the battery pack by the removing request.

The charging system may further include an electric power path. The electric power path may be configured to supply the charging power to the battery pack (specifically, for example, to the battery pack attached to the charger). The functional circuit may include a switch circuit and a first forcible interruption circuit. The switch circuit may be configured to establish (or complete) the electric power path in response to receiving the first drive signal. The switch circuit may be configured to interrupt the electric power path in response to not receiving the first drive signal. The first forcible interruption circuit may be configured to disable the first drive signal to thereby interrupt the electric power path through the switch circuit in response to the reception circuit receiving the faulty state information.

In the above-described charging system, the charging control circuit can appropriately diagnose whether the switch circuit forcibly interrupts the electric power path in response to the faulty state information from the battery pack.

The charging control circuit may be configured to output the first drive signal in response to the reception circuit receiving the non-faulty state information. The charging control circuit may be configured to stop output of the first drive signal in response to the reception circuit receiving the faulty state information.

The charger may further include a separate functional circuit. The separate functional circuit may be configured to perform a fourth function in response to the reception circuit receiving the non-faulty state information. The separate functional circuit may be configured to perform a fifth function in response to the reception circuit receiving the faulty state information. The fifth function may be different from the fourth function.

The charging control circuit may be further configured to execute a third diagnosis process. The third diagnosis process may include a process of diagnosing whether the separate functional circuit operates properly by comparing a first operation state with a second operation state. The first operation state may correspond to an operation state of the separate functional circuit in the charger that receives the non-faulty state information. The second operation state may correspond to an operation state of the separate functional circuit in the charger that receives the faulty state information transmitted in response to the faulty state information request process.

In the above-described charging system, the charging control circuit can diagnose both the functional circuit and the separate functional circuit appropriately and efficiently. Accordingly, it is possible to achieve an improved reliability of the charger including the functional circuit and the separate functional circuit.

The separate functional circuit may include a precharging circuit and a second forcible interruption circuit. The precharging circuit may be configured to receive the charging power. The precharging circuit may be configured to output the precharging power in response to receiving the second drive signal. The precharging power corresponds to the charging power that is limited within a preset range. The second forcible interruption circuit may be configured to permit operation of the precharging circuit in response to the reception circuit receiving the non-faulty state information. The second forcible interruption circuit may be configured to disable the second drive signal to thereby stop output of the precharging power from the precharging circuit in response to the reception circuit receiving the faulty state information. The battery may be configured to be charged with the precharging power supplied from the charger.

In the above-described charging system, the charging control circuit can appropriately diagnose whether the output of the precharging power is stopped in response to the faulty state information from the battery pack.

The charging control circuit may be configured to output the second drive signal in response to the reception circuit receiving the non-faulty state information. The charging control circuit may be configured to stop output of the second drive signal in response to the reception circuit receiving the faulty state information.

The first faulty state may correspond to: a state of the battery pack in which discharge from the battery should be stopped; and/or a state of the battery pack in which charging of the battery should be stopped.

The first faulty state may correspond to: a state of the battery pack in which a voltage value of the battery is less than a voltage lower limit value; a state of the battery pack in which a value of a discharge current from the battery exceeds a current upper limit value; and/or a state of the battery pack in which a temperature of the battery exceeds an upper limit temperature.

A battery pack in another one aspect of the present disclosure includes a terminal. The terminal is configured to be selectively connected to one of an electric working machine and a charger. The battery pack includes a battery. The battery is configured to be charged with charging power supplied from the charger. The battery pack includes an information output circuit. The information output circuit is configured to output faulty state information in response to the battery pack being in a first faulty state. The information output circuit is configured to output the faulty state information in response to (i) the battery pack not being in the first faulty state and also (ii) the information output circuit receiving a faulty state information request from the charger. The faulty state information indicates that the battery pack is in the first faulty state. The faulty state information request requests the battery pack to output the faulty state information.

The information output circuit may be configured to output non-faulty state information in response to the battery pack not being in the first faulty state. The non-faulty state information may indicate that the battery pack is not in the first faulty state.

The above-described battery pack outputs the faulty state information in response to receiving the faulty state information request from the charger, even if the battery pack is not in the first faulty state. This enables the charger to confirm operation of the charger in response to receiving the faulty state information from the battery pack, thereby contributing to an improved reliability of the charger.

A charger in a further aspect of the present disclosure includes a terminal configured such that a battery pack is detachably connected to the terminal. The terminal is configured to supply charging power to the battery pack. The battery pack is configured to be detachably connected to an electric working machine. The charger includes a charging power generation circuit configured to generate the charging power.

The charger includes a charging control circuit configured to transmit a faulty state information request. The faulty state information request requests the battery pack to output faulty state information. The battery pack is configured to output the faulty state information in response to the battery pack being in a first faulty state. The faulty state information indicates that the battery pack is in the first faulty state. The battery pack is configured to output the faulty state information in response to (i) the battery pack not being in the first faulty state and also (ii) the battery pack receiving the faulty state information request from the charger.

The charger includes a reception circuit configured to receive the faulty state information.

The reception circuit may also be configured to receive non-faulty state information. The non-faulty state information may indicate that the battery pack is not in the first faulty state. The battery pack may be configured to output the non-faulty state information in response to the battery pack not being in the first faulty state.

The charger may include a functional circuit separately provided from the charging control circuit. The functional circuit may be configured to perform a first function in response to the reception circuit receiving the non-faulty state information. The functional circuit may be configured to perform a second function in response to the reception circuit receiving the faulty state information.

The charging control circuit may be configured to execute an faulty state information request process. The faulty state information request process may include a process of transmitting the faulty state information request in response to the reception circuit receiving the non-faulty state information. The charging control circuit may be configured to execute an operation information acquisition process. The operation information acquisition process may include a process of acquiring operation information in response to the reception circuit receiving the faulty state information. The faulty state information may be transmitted from the battery pack in response to the faulty state information request process. The operation information may indicate an operation state of the functional circuit. The charging control circuit may be configured to execute a first diagnosis process. The first diagnosis process may include a process of diagnosing whether the functional circuit operates properly, based on the acquired operation information.

The above-described charger may perform a diagnosis of whether the functional circuit operates properly in association with the battery pack. Accordingly, it is possible to provide a charger with an improved reliability.

BRIEF DESCRIPTION OF THE DRAWINGS

An embodiment of the present disclosure will be described below by way of example with reference to the accompanying drawings, in which:

FIG. 9 is a flowchart of a battery main process executed by the battery pack.

DETAILED DESCRIPTION OF EXEMPLARY EMBODIMENTS

Embodiment (1) Overview of Charging System and Electric Working Machine

Descriptions will be given of a charging system and an electric working machine of the present embodiment with reference to FIG. 1 to FIG. 3.

Figure 1:
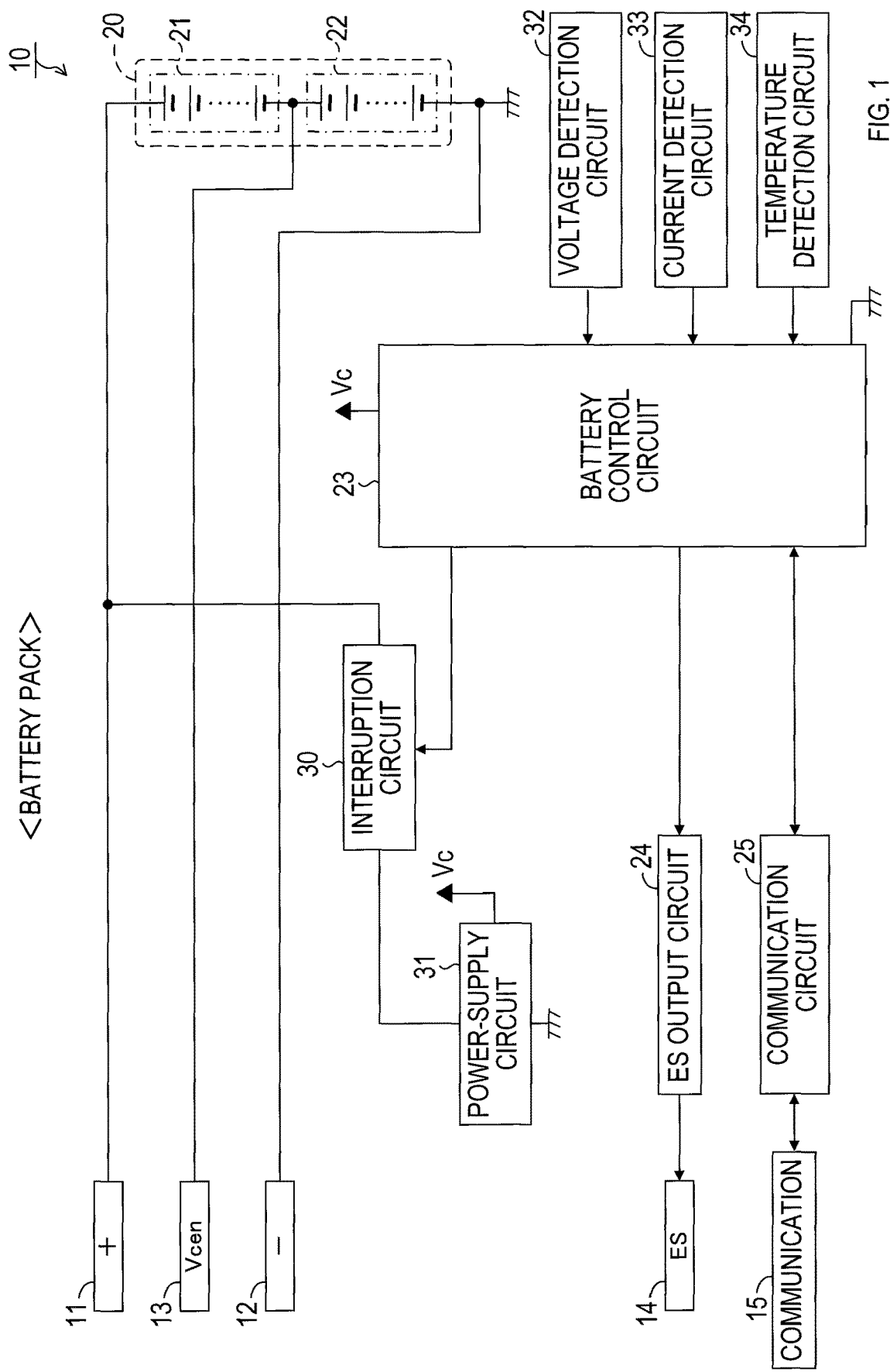
FIG. 1 is an explanatory diagram showing an electrical configuration of a battery pack of the embodiment.
Figure 2:
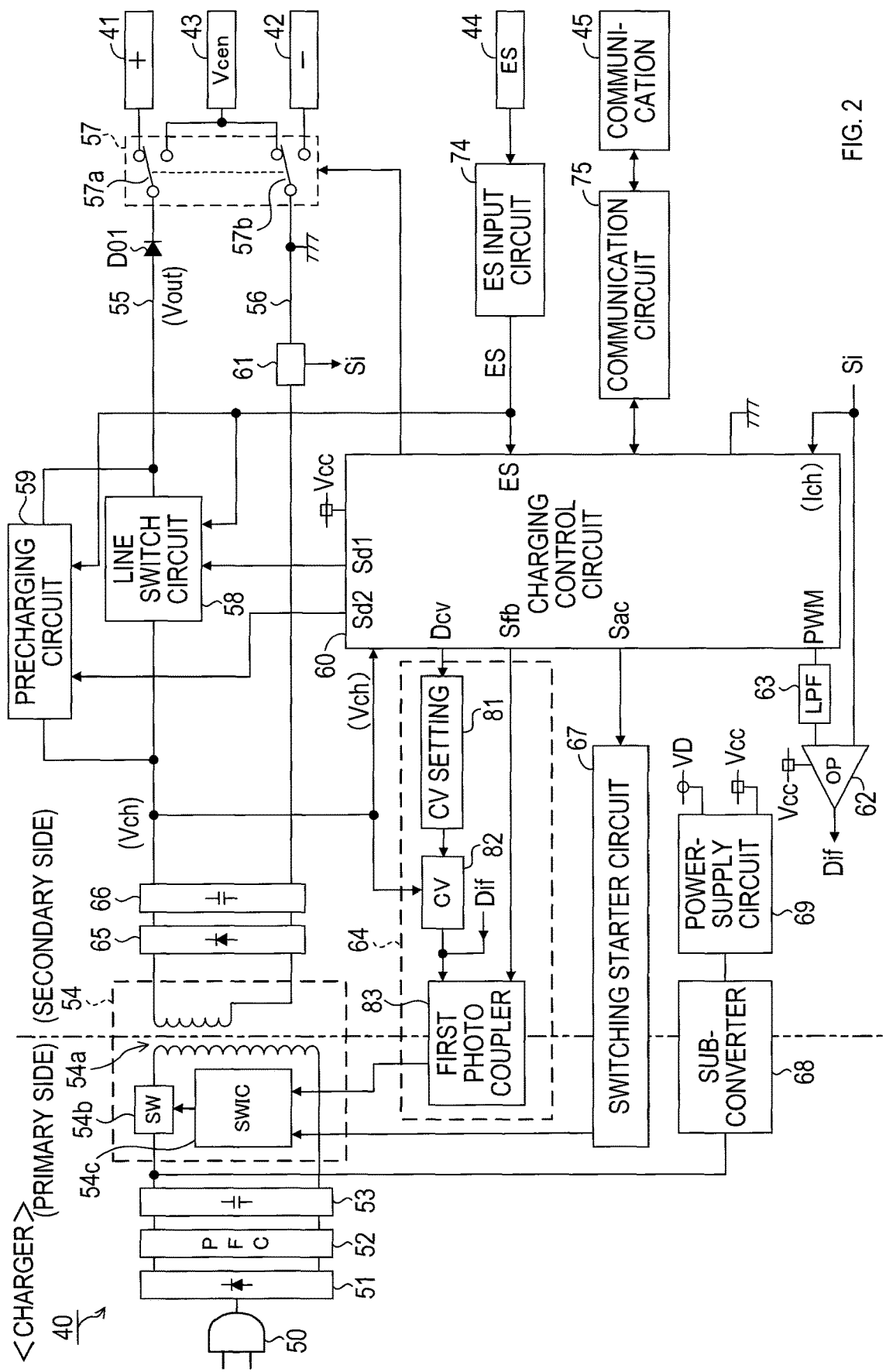
FIG. 2 is an explanatory diagram showing an electrical configuration of a charger of the embodiment.

The charging system of the present embodiment includes a battery pack 10 shown in FIG. 1 and a charger 40 shown in FIG. 2. The charger 40 is configured such that the battery pack 10 is attached thereto and detached therefrom.

As shown in FIG. 1, the battery pack 10 includes a battery 20. The battery 20 is a rechargeable battery. The battery 20 may be any kind of rechargeable battery. In the present embodiment, the battery 20 is, for example, a lithium-ion battery.

The battery 20 of the present embodiment includes a first cell group 21 and a second cell group 22, which are connected in series. Each of the first cell group 21 and the second cell group 22 includes two or more cells. The two or more cells may be connected to one another in any manner. In the present embodiment, for example, the two or more cells are connected in series in each of the first cell group 21 and the second cell group 22.

Rated voltage values of the first cell group 21 and the second cell group 22 may be any values. In the present embodiment, the rated voltage value of the first cell group 21 and the rated voltage value of the second cell group 22 are each, for example, 28.8 V, and a rated voltage value of the battery 20 is, for example, 57.6 V. The first cell group 21 and the second cell group 22 in the present embodiment each include, for example, eight cells connected in series. A rated voltage value of each cell is, for example, 3.6 V.

An actual voltage value of the battery 20 may vary according to a charged state of the battery 20. Specifically, the voltage value of the battery 20 may be a value less than 57.6 V, and also may be a value greater than 57.6 V (e.g., 64 V). The battery 20 may include any number of cells. The rated voltage value of each cell may be any value. The rated voltage value of the battery 20 may be any value.

The battery pack 10 is configured to be attached to and detached from various electric apparatuses, including a working machine body 200 (see FIG. 3) to be described below. The battery pack 10 is configured to supply electric power (hereinafter referred to as a "battery power") of the battery 20 to an electric apparatus upon attachment of the battery pack 10 to the electric apparatus.

Figure 3:
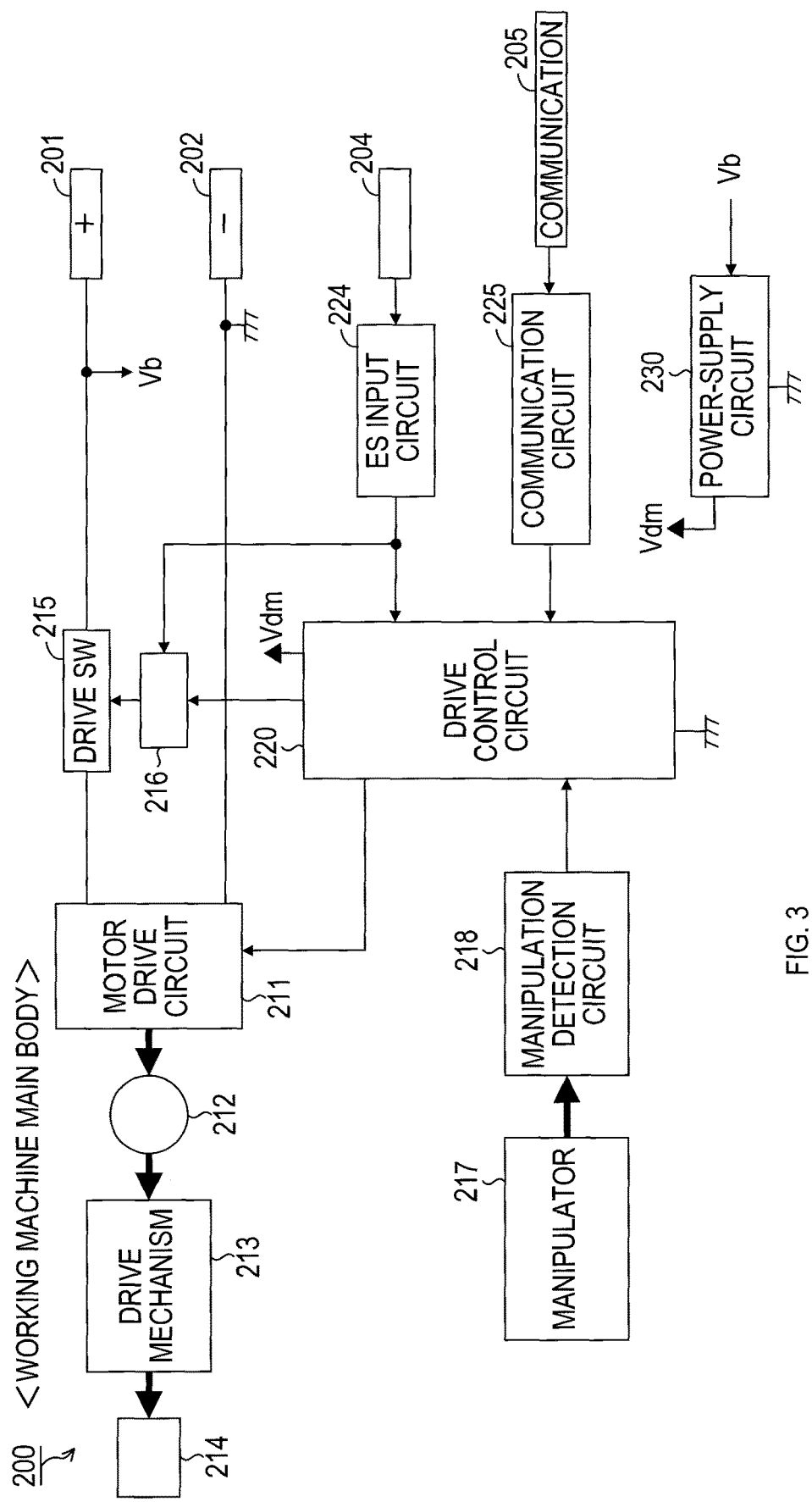
FIG. 3 is an explanatory diagram showing an electrical configuration of a working machine main body of the embodiment.

The electric working machine of the present embodiment includes the battery pack 10 shown in FIG. 1 and the working machine body 200 shown in FIG. 3. The working machine body 200 is configured such that the battery pack 10 is attached thereto and detached therefrom.

Upon attachment of the battery pack 10 to the working machine body 200, the battery power is supplied to the working machine body 200. The working machine body 200 is operated by the battery power.

The working machine body 200 may be configured to perform operations for any of various applications, such as gardening, stone processing, metal processing, and wood processing. The electric working machine of the present embodiment may be, for example, a rechargeable brush cutter for cutting grass, small-diameter trees, and so on.

(2) Configuration of Battery Pack

As shown in FIG. 1, the battery pack 10 includes a positive terminal 11, a negative terminal 12, a center terminal 13, an error stop (ES) terminal 14, and a communication terminal 15.

The positive terminal 11 is connected to a positive electrode of the battery 20 (specifically, a positive electrode of the first cell group 21). The negative terminal 12 is connected to a negative electrode of the battery 20 (specifically, a negative electrode of the second cell group 22). The center terminal 13 is connected to a positive electrode of the second cell group 22 of the battery 20 (in other words, a negative electrode of the first cell group 21).

The battery pack 10 further includes a battery control circuit 23, an ES output circuit 24, a communication circuit 25, an interruption circuit 30, a power-supply circuit 31, a voltage detection circuit 32, a current detection circuit 33, a temperature detection circuit 34.

The ES output circuit 24 is connected to the ES terminal 14. The communication circuit 25 is connected to the communication terminal 15. The ES output circuit 24 and the communication circuit 25 are connected to the battery control circuit 23.

The voltage detection circuit 32 outputs battery voltage information to the battery control circuit 23. The battery voltage information indicates a value (hereinafter referred to as a "battery voltage value") of voltage (hereinafter referred to as a "battery voltage") of the battery 20. The battery voltage information may indicate, for example, a voltage value of the first cell group 21, a voltage value of the second cell group 22, and/or the battery voltage value.

During discharge from the battery 20 to the electric apparatus, the current detection circuit 33 outputs discharge current information to the battery control circuit 23. The discharge current information indicates a value of a discharge current from the battery 20. During charging of the battery 20 by the charger 40, the current detection circuit 33 outputs charging current information to the battery control circuit 23. The charging current information indicates a value of charging current supplied from the charger 40 to the battery 20.

The temperature detection circuit 34 detects a temperature of the battery 20, and outputs temperature information to the battery control circuit 23. The temperature information indicates a temperature of the battery 20 detected by the temperature detection circuit 34.

The battery voltage is inputted to the power-supply circuit 31 through the interruption circuit 30. The interruption circuit 30 is arranged in a current path connecting the positive electrode of the battery 20 to the power-supply circuit 31, to establish or interrupt the current path. The interruption circuit 30 is turned on or off by the battery control circuit 23. In response to turning-on of the interruption circuit 30, the current path is established, and the battery voltage is supplied to the power-supply circuit 31. In response to turning-off of the interruption circuit 30, the current path is interrupted, and the battery voltage is not supplied to the power-supply circuit 31. The interruption circuit 30 may have any configuration. The interruption circuit 30 may include, for example, a switching element that establishes or interrupt the current path.

The power-supply circuit 31 generates a control voltage Vc of a direct-current based on an input voltage of the direct-current into the power-supply circuit 31. The control voltage Vc is less than the input voltage. The control voltage Vc is supplied to various components, including the battery control circuit 23, in the battery pack 10.

The power-supply circuit 31 may have any configuration. The power-supply circuit 31 may include a switching regulator, and may be configured to convert the input voltage to the control voltage Vc using the switching regulator. Alternatively, the power-supply circuit 31 may include a linear regulator, and may be configured to convert the input voltage to the control voltage Vc using the linear regulator. The control voltage Vc may have any voltage value.

The battery control circuit 23 includes, for example, a microcomputer including a CPU and a memory. The memory may include a semiconductor memory, such as a RAM, a ROM, or a flash memory. The memory stores various programs and data to be read and executed by the CPU to achieve various functions of the battery pack 10. The program stored in the memory includes a program of a below-described battery main process. These various functions need not necessarily be achieved by software processing, but some or all of the functions may be achieved by hardware, including a logic circuit, an analog circuit, and so on.

The battery control circuit 23 is configured to detect whether the charger 40 or a working machine main body 200 is attached to the battery pack 10. Upon detection of attachment of the battery pack 10 to the charger 40, the battery control circuit 23 executes a first charging control process. The first charging control process includes a process to control charging of the battery 20 by the charger 40, based on various information, including the battery voltage information, the discharge current information, the charging current information, and/or the temperature information. Upon detection of attachment of the battery pack 10 to the working machine main body 200, the battery control circuit 23 controls discharge from the battery 20 to the working machine main body 200, based on the aforementioned various information.

The battery control circuit 23 includes a data communication (for example, serial communication) function. Specifically, the battery control circuit 23 transmits transmission data from the communication terminal 15 through the communication circuit 25. Also, the battery control circuit 23 receives reception data inputted to the communication terminal 15 through the communication circuit 25. The battery pack 10 may include, in place of the communication terminal 15, a transmission terminal from which the transmission data is transmitted and a reception terminal at which the reception data is received.

The battery control circuit 23 performs data communication with the charger 40 in the first charging control process, to thereby transmit to the charger 40 and/or receive from the charger 40 information necessary for charging the battery 20. Specifically, for example, the battery control circuit 23 calculates a value of a charging current required to charge the battery 20 based on the battery voltage, and transmits a charging current command value to the charger 40. The charging current command value indicates a value of the charging current calculated by the battery control circuit 23.

The battery control circuit 23 determines whether the battery 20 is in an over-discharge state, based on the battery voltage information inputted from the voltage detection circuit 32. The battery control circuit 23 may determine whether the battery 20 is in the over-discharge state in any manner. The battery control circuit 23 may determine that the battery 20 is in the over-discharge state, for example, in a case where the battery voltage value indicated by the battery voltage information is less than a specified minimum value (a voltage lower limit value).

While the battery 20 is not in the over-discharge state, the battery control circuit 23 turns on the interruption circuit 30, to thereby supply the battery power to the power-supply circuit 31 through the interruption circuit 30. In this case, the power-supply circuit 31 generates the control voltage Vc based on the battery voltage (in other words, converts the battery voltage to the control voltage Vc).

Upon determination that the battery 20 is in the over-discharge state, the battery control circuit 23 sets the battery control circuit 23 in a shutdown mode. Specifically, the battery control circuit 23 turns off the interruption circuit 30, to thereby interrupt input of the battery voltage to the power-supply circuit 31. As a result, the power-supply circuit 31 stops output of the control voltage Vc. In the shutdown mode, the control voltage Vc is not inputted to the battery control circuit 23, and thus operation of the battery control circuit 23 is stopped.

The voltage detection circuit 32 may output information indicating a voltage value of each of the cells in the battery 20 to the battery control circuit 23. In this case, the battery control circuit 23 may determine that the battery 20 is in the over-discharge state if the voltage value of at least one of the cells is less than a specified minimum value.

Alternatively, in place of the battery control circuit 23, the voltage detection circuit 32 may determine that the battery 20 is in the over-discharge state if the battery voltage value is less than the minimum value, or the voltage value of at least one of the cells is less than the minimum value. In this case, the battery control circuit 23 may turn off the interruption circuit 30 in response to the determination of the over-discharge state by the voltage detection circuit 32.

In the shutdown mode, the battery control circuit 23 stops operation, and thus cannot turn on the interruption circuit 30 by itself. Attachment of the battery pack 10 to the charger 40 in operation results in release of the shutdown mode. The battery pack 10 of the present embodiment is configured such that a below-described first power supply voltage Vcc is inputted from the charger 40 upon attachment of the battery pack 10 to the charger 40 in operation. The first power supply voltage Vcc inputted from the charger 40 is inputted to the power-supply circuit 31.

In response to input of the first power supply voltage Vcc to the power-supply circuit 31 while the battery control circuit 23 is in the shutdown mode, the power-supply circuit 31 generates the control voltage Vc based on the first power supply voltage Vcc (in other words, converts the first power supply voltage Vcc to the control voltage Vc). Supply of the control voltage Vc from the power-supply circuit 31 to the battery control circuit 23 activates the battery control circuit 23. The battery control circuit 23 activated from the shutdown mode turns on the interruption circuit 30, to thereby release the shutdown mode upon reach of the battery voltage value to the minimum value or greater due to charging of the battery 20. As a result, the battery voltage is inputted to the power-supply circuit 31, thus enabling the power-supply circuit 31 to generate the control voltage Vc based on the battery voltage.

The battery control circuit 23 also monitors whether the battery pack 10 is in a specific faulty state (a first faulty state), and outputs a permission command or a prohibition command to the ES output circuit 24 based on a result of the monitoring. The specific faulty state may be, for example, a state in which discharge from the battery 20 and charging of the battery 20 should be stopped.

The battery control circuit 23 may determine whether the battery pack 10 is in the specific faulty state in any manner. The battery control circuit 23 may determine whether the battery pack 10 is in the specific faulty state based on, for example, at least the battery voltage information, the discharge current information, the charging current information, or the temperature information, described above.

The specific faulty state may be any state. The battery control circuit 23 may determine that the battery pack 10 is in the specific faulty state if, for example, the battery 20 is in the over-discharge state or if the over-discharge state continues for a specified period of time. The battery control circuit 23 may determine that the battery pack 10 is in the specific faulty state if, for example, the value of the discharge current from the battery 20 exceeds a specified current upper limit or if a state in which the value of the discharge current from the battery 20 exceeds the current upper limit continues for a specified period of time. The battery control circuit 23 may determine that the battery pack 10 is in the specific faulty state if, for example, a temperature of the battery 20 exceeds a specified upper limit temperature or if a state in which the temperature exceeds the upper limit temperature continues for a specified period of time.

If the battery pack 10 is not in the specific faulty state, then the battery control circuit 23 outputs the permission command (e.g., a HIGH-level signal in the present embodiment) to the ES output circuit 24. If the battery pack 10 is in the specific faulty state, then the battery control circuit 23 outputs the prohibition command (e.g., a LOW-level signal in the present embodiment) to the ES output circuit 24.

The ES output circuit 24 outputs an ES command. The ES command includes an ES permission command or an ES prohibition command. Upon receiving input of the permission command from the battery control circuit 23, the ES output circuit 24 outputs the ES permission command through the ES terminal 14. Upon receiving input of the prohibition command from the battery control circuit 23, the ES output circuit 24 outputs the ES prohibition command through the ES terminal 14.

More specifically, upon receiving input of the permission command from the battery control circuit 23, the ES output circuit 24 of the present embodiment sets an input impedance of the ES terminal 14 (that is, an impedance of the ES output circuit 24 from the perspective of the ES terminal 14) to a low impedance. Upon receiving input of the prohibition command from the battery control circuit 23, the ES output circuit 24 of the present embodiment sets the input impedance of the ES terminal 14 to a high impedance. In other words, outputting the ES permission command means setting of the input impedance of the ES terminal 14 to a low impedance, and outputting the ES prohibition command means setting the input impedance of the ES terminal 14 to a high impedance. However, the ES permission command may be configured to set the ES terminal 14 to have any electrical properties other than the impedance. The ES prohibition command may be configured to set the ES terminal 14 to have any electrical properties other than the impedance.

(3) Configuration of Charger

As shown in FIG. 2, the charger 40 includes a positive terminal 41, a negative terminal 42, a center terminal 43, an ES terminal 44, and a communication terminal 45.

Upon attachment of the battery pack 10 to the charger 40, the aforementioned terminals of the charger 40 are connected to terminals of the battery pack 10 as described below. The positive terminal 41 is connected to the positive terminal 11 of the battery pack 10. The negative terminal 42 is connected to a negative terminal 12 of the battery pack 10. The center terminal 43 is connected to the center terminal 13 of the battery pack 10. The ES terminal 44 is connected to the ES terminal 14 of the battery pack 10. The communication terminal 45 is connected to the communication terminal 15 of the battery pack 10.

The charger 40 further includes a power plug 50, a rectifier circuit 51, a Power Factor Correction (PFC) circuit 52, a smoothing circuit 53, a main converter 54, a positive electrode line 55, a negative electrode line 56, a cell group switching circuit 57, a line switch circuit 58, a precharging circuit 59, a charging control circuit 60, a current detection circuit 61, a differential amplifier circuit 62, a low-pass filter 63, an output setting circuit 64, and a switching starter circuit 67.

The power plug 50 is connected to an AC power source, such as a commercial power source that supplies a voltage of, for example, AC 100 V, and is configured to receive the AC power from the AC power source. The rectifier circuit 51 rectifies (e.g., full-wave rectifies) the AC power inputted from the power plug 50, and outputs the rectified AC power. The PFC circuit 52 improves a power factor of the AC power inputted to the rectifier circuit 51. The smoothing circuit 53 smooths the electric power outputted from the PFC circuit 52. The smoothing circuit 53 of the present embodiment includes a capacitor for smoothing the electric power inputted to the smoothing circuit 53. One of the purposes of providing the PFC circuit 52 is to make the power factor of the AC power closer to 1 by bringing the waveform of the AC current of the AC power inputted from the power plug 50 closer to a sine wave.

The main converter 54 converts a DC power smoothed by the smoothing circuit 53 to a charging power having a voltage suitable for charging the battery 20. In the present embodiment, the main converter 54 includes, for example, an insulated step-down switching power supply circuit.

More specifically, the main converter 54 includes a transformer 54a, a main switch 54b, and a switching control circuit 54c. The direct current power is inputted to a primary side (that is, a primary winding) of the transformer 54a.

The main switch 54b is provided in a supply path to supply the direct current power from the smoothing circuit 53 to the primary side of the transformer 54a. The main switch 54b establishes or interrupts the supply path. The main switch 54b may be any type of switch. In the present embodiment, the main switch 54b includes a semiconductor switching element (for example, a Field-Effect Transistor (FET)). The supply path is established or interrupted by turning on or off of the semiconductor switching element.

The switching control circuit 54c controls the main switch 54b. The switching control circuit 54c is activated in response to input of a start signal from the switching starter circuit 67. The switching control circuit 54c stops operation in response to input of a stop signal from the switching starter circuit 67.

The switching control circuit 54c turns on or off the main switch 54b based on a switching control signal inputted from the output setting circuit 64, to thereby generate a charging power at a secondary side (that is, a secondary winding) of the transformer 54a. The secondary side of the transformer 54a is connected to a first end of the positive electrode line 55 and a first end of the negative electrode line 56. The charging power is supplied from the main converter 54 to the battery pack 10 through the positive electrode line 55 and the negative electrode line 56.

A second end of the positive electrode line 55 and a second end of the negative electrode line 56 are connected to the cell group switching circuit 57. The cell group switching circuit 57 includes a positive electrode switch 57a and a negative electrode switch 57b, which are operated in association with each other. The positive electrode switch 57a and the negative electrode switch 57b are C-contact type switches. The second end of the positive electrode line 55 is connected to a common terminal of the positive electrode switch 57a, and the second end of the negative electrode line 56 is connected to a common terminal of the negative electrode switch 57b.

A first terminal of the positive electrode switch 57a is connected to the positive terminal 41. A second terminal of the positive electrode switch 57a is connected to the center terminal 43. A first terminal of the negative electrode switch 57b is connected to the center terminal 43. A second terminal of the negative electrode switch 57b is connected to the negative terminal 42.

The cell group switching circuit 57 is switched to a first connected state or a second connected state in accordance with a switching command inputted from the charging control circuit 60. In the first connected state, the common terminal of the positive electrode switch 57a is connected to the first terminal of the positive electrode switch 57a, and the common terminal of the negative electrode switch 57b is connected to the first terminal of the negative electrode switch 57b. In the second connected state, the common terminal of the positive electrode switch 57a is connected to the second terminal of the positive electrode switch 57a, and the common terminal of the negative electrode switch 57b is connected to the second terminal of the negative electrode switch 57b.

In the present embodiment, the battery 20 is charged while the cell group switching circuit 57 is alternately switched between the first connected state and the second connected state. Specifically, the first cell group 21 is charged in the first connected state, and the second cell group 22 is charged in the second connected state.

The line switch circuit 58 is provided in the positive electrode line 55, to establish or interrupt the positive electrode line 55. The line switch circuit 58 is turned on in response to an input of a first drive signal Sd1 from the charging control circuit 60, to thereby establish the positive electrode line 55. With no input of the first drive signal Sd1 from the charging control circuit 60, the line switch circuit 58 is in OFF and interrupts the positive electrode line 55.

The first drive signal Sd1 is a pulse signal with a specified frequency in the present embodiment. An output terminal of the first drive signal Sd1 in the charging control circuit 60 is maintained at a LOW-level while the first drive signal Sd1 is not outputted.

Figure 5:
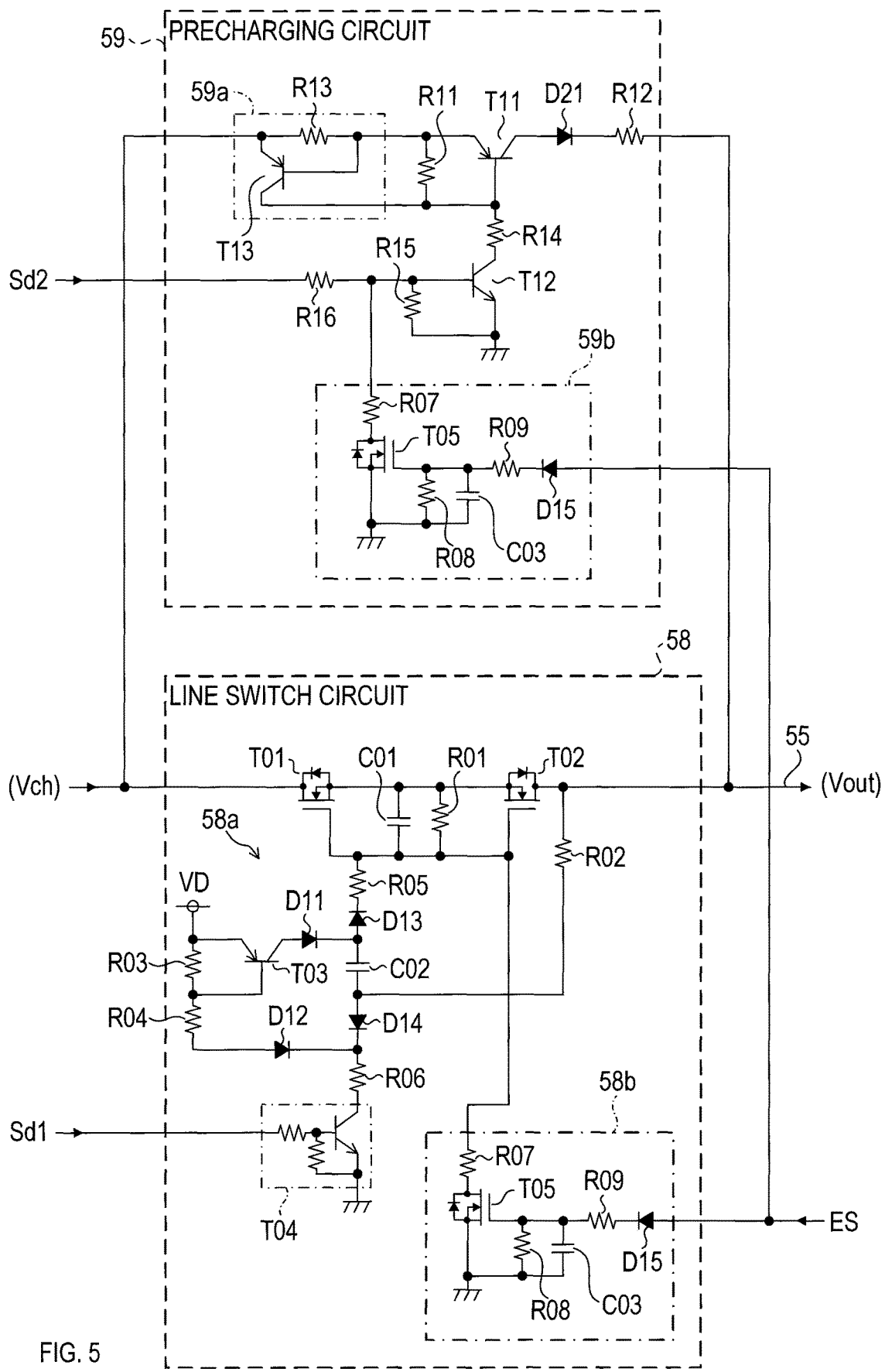
FIG. 5 is an electric circuit diagram showing specific configurations of a line switch circuit and a precharging circuit in the charger.

In response to turning-on of the line switch circuit 58, the positive electrode line 55 is established, thus enabling supply of charging power to the battery pack 10. In response to turning-off of the line switch circuit 58, the positive electrode line 55 is interrupted, thus disabling supply of charging power to the battery pack 10. The line switch circuit 58 may have any configuration. For example, the line switch circuit 58 is configured as shown in FIG. 5 in the present embodiment.

The charging control circuit 60 includes, for example, a microcomputer including a CPU and a memory. The memory may include a semiconductor memory, such as a RAM, a ROM, or a flash memory. The memory stores various programs and data to be read and executed by the CPU to achieve various functions of the charger 40. The programs stored in the memory include a program for a below-described charger main process. These various functions need not necessarily be achieved by software processing, but may be achieved partially or entirely by hardware, including a logic circuit, an analog circuit, and so on.

The charging control circuit 60 performs normal charging or precharging in a below-described second charging control process, to thereby charge the battery 20. During the normal charging, charging power is supplied to the battery pack 10 through the line switch circuit 58, During precharging, charging power is supplied to the battery pack 10 through the precharging circuit 59.

The charging control circuit 60 basically charges the battery 20 by normal charging. However, in a case where the battery voltage value is less than a first minimum value (for example, 25 V) before starting charging of the battery 20, the charging control circuit 60 first performs precharging. Specifically, the charging control circuit 60 turns off the line switch circuit 58 and outputs a second drive signal Sd2 to the precharging circuit 59, thereby activating the precharging circuit 59. Upon activation of the precharging circuit 59, charging power is supplied to the battery pack 10 through the precharging circuit 59.

Upon reaching a second minimum value of the battery voltage value as a result of precharging, the charging control circuit 60 changes to normal charging. Specifically, the charging control circuit 60 stops output of the second drive signal Sd2, and outputs the first drive signal Sd1. The second minimum value may be identical with the first minimum value, or may be different from the first minimum value.

The precharging circuit 59 may have any configuration. For example, the precharging circuit 59 is configured as shown in FIG. 5 in the present embodiment.

The current detection circuit 61 is provided in the negative electrode line 56. The current detection circuit 61 outputs a current detection signal Si. The current detection signal Si indicates a value of a charging current (charging current value Ich) outputted from the main converter 54. The current detection signal Si is an analog signal having a voltage value in accordance with the charging current value Ich. The current detection circuit 61 may include, for example, a shunt resistor (not shown) arranged in the negative electrode line 56, and may be configured to output the current detection signal Si corresponding to a voltage across the shunt resistor. The current detection signal Si is inputted to the charging control circuit 60 and the differential amplifier circuit 62.

The charging control circuit 60 obtains the charging current command value from the battery pack 10 by data communication with the battery pack 10 in the second charging control process. The charging control circuit 60 generates a pulse-width modulation (PWM) signal in accordance with the obtained charging current command value, that is, a pulse signal having a duty ratio in accordance with the charging current command value, and outputs the PWM signal to the low-pass filter 63. The low-pass filter 63 smooths the PWM signal inputted from the charging control circuit 60 and output the smoothed PWM signal to the differential amplifier circuit 62.

The differential amplifier circuit 62 outputs a differential signal Dif in accordance with a difference between a voltage value of the PWM signal smoothed by the low-pass filter 63 (that is, a value corresponding to the charging current command value) and the voltage value of the current detection signal Si (that is, a value corresponding to an actual charging current Ich). The differential signal Dif is inputted to the output setting circuit 64. In the present embodiment, the charging control circuit 60 may obtain the charging current command value indicating, for example, 1000 mA or a value in the vicinity or 1000 mA.

In the present embodiment, the charging control circuit 60 outputs the PWM signal in accordance with the charging current command value during either normal charging or precharging. Thus, if the charging current command value indicates, for example, 1000 mA, the charging control circuit 60 outputs the PWM signal indicating 1000 mA during either normal charging or precharging. However, a value of the charging current outputted from the precharging circuit 59 is limited by a limiter circuit 59a (see FIG. 5) to a specified level or less (for example, 200 mA or less) as described below.

The output setting circuit 64 includes a CV setting circuit 81, a CV circuit 82, and a first photocoupler 83. The differential signal Dif is inputted to a secondary side (that is, a side of a not-shown light emitting diode) of the first photocoupler 83. The light emitting diode emits light having a light amount corresponding to the differential signal Dif.

The light emitted by the light emitting diode is received at a primary side (that is, a not-shown phototransistor) of the first photocoupler 83. The first photocoupler 83 outputs the switching control signal in accordance with the light amount received at the primary side to the switching control circuit 54c.

Then, the switching control circuit 54c drives the main switch 54b in accordance with the differential signal Dif. As a result, the main converter 54 generates a charging power corresponding to the differential signal Dif. Specifically, the switching control circuit 54c controls the main switch 54b to reduce the differential signal Dif to zero.

The CV setting circuit 81 receives input of a CV setting value Dcv from the charging control circuit 60. The charging control circuit 60 outputs the CV setting value Dcv to the CV setting circuit 81 in the second charging control process. The charging control circuit 60 sets an upper limit value of the charging voltage value Vch in the second charging control process, in order to inhibit the voltage value (charging voltage value Vch) of the charging power, which is outputted from the main converter 54, from becoming excessive. The CV setting value Dcv indicates the upper limit value. The CV setting value Dcv is digital data.

The CV setting circuit 81 performs signal processing based on the inputted CV setting value Dcv. The signal processing includes a process of converting the CV setting value Dcv to a CV setting signal in analog form. The CV setting signal outputted from the CV setting circuit 81 is inputted to the CV circuit 82.

The CV setting signal from the CV setting circuit 81 and a charging voltage signal are inputted to the CV circuit 82. The charging voltage signal is an analog signal indicating an actual charging voltage value Vch. The CV circuit 82 compares the CV setting signal with the charging voltage signal. If the charging voltage signal is greater than the CV setting signal (that is, the actual charging voltage value Vch exceeds the upper limit value), then the CV circuit 82 outputs an output limit signal to the first photocoupler 83. The output limit signal is a signal in accordance with a difference between the charging voltage signal and the CV setting signal. The charging voltage signal is also inputted to the charging control circuit 60. The charging control circuit 60 can obtain the charging voltage value Vch based on the charging voltage signal.

Upon receiving the output limit signal from the CV circuit 82, the first photocoupler 83 disables the differential signal Dif, and outputs to the switching control circuit 54c the switching control signal to inhibit the charging voltage value Vch from exceeding the upper limit value. As a result, the charging voltage value Vch is inhibited from exceeding the upper limit value.

During normal charging, the charging control circuit 60 sets the upper limit value of the charging voltage value Vch to, for example, 38 V, and outputs the CV setting value Dcv indicating 38 V. During precharging, the charging control circuit 60 sets the upper limit value of the charging voltage value Vch to a value less than the upper limit value during normal charging (for example, 25 V), and outputs the CV setting value Dcv indicating the set upper limit value.

The first photocoupler 83 is further configured to receive input of an FB enabling signal Sfb from the charging control circuit 60. The charging control circuit 60 does not output the FB enabling signal Sfb while charging of the battery 20 is unnecessary. The charging control circuit 60 outputs the FB enabling signal Sfb to charge the battery 20.

While receiving input of the FB enabling signal Sfb, the first photocoupler 83 outputs the switching control signal corresponding to the differential signal Dif. While not receiving input of the FB enabling signal Sfb, the first photocoupler 83 outputs the switching control signal to disable the differential signal Dif and to reduce the charging current value Ich to zero ampere (that is, to stop output of the charging power from the main converter 54).

Upon receiving input of a switching start signal Sac from the charging control circuit 60, the switching starter circuit 67 outputs a start signal to the switching control circuit 54c. The switching control circuit 54c is activated upon receiving the start signal. Without receiving input of the switching start signal Sac, the switching starter circuit 67 does not output a start signal. The switching start signal Sac is a pulse signal having a specified frequency (for example, 500 Hz) in the present embodiment. Without output of the pulse signal, an output terminal of the switching start signal Sac is maintained at a LOW-level, which means that the switching start signal Sac is not outputted.

The switching control circuit 54c controls the main switch 54b in accordance with the switching control signal in response to input of the start signal. Without receiving input of the start signal, the switching control circuit 54c stops operation. In this case, the main switch 54b is turned off, and charging power is not generated.

Figure 4:
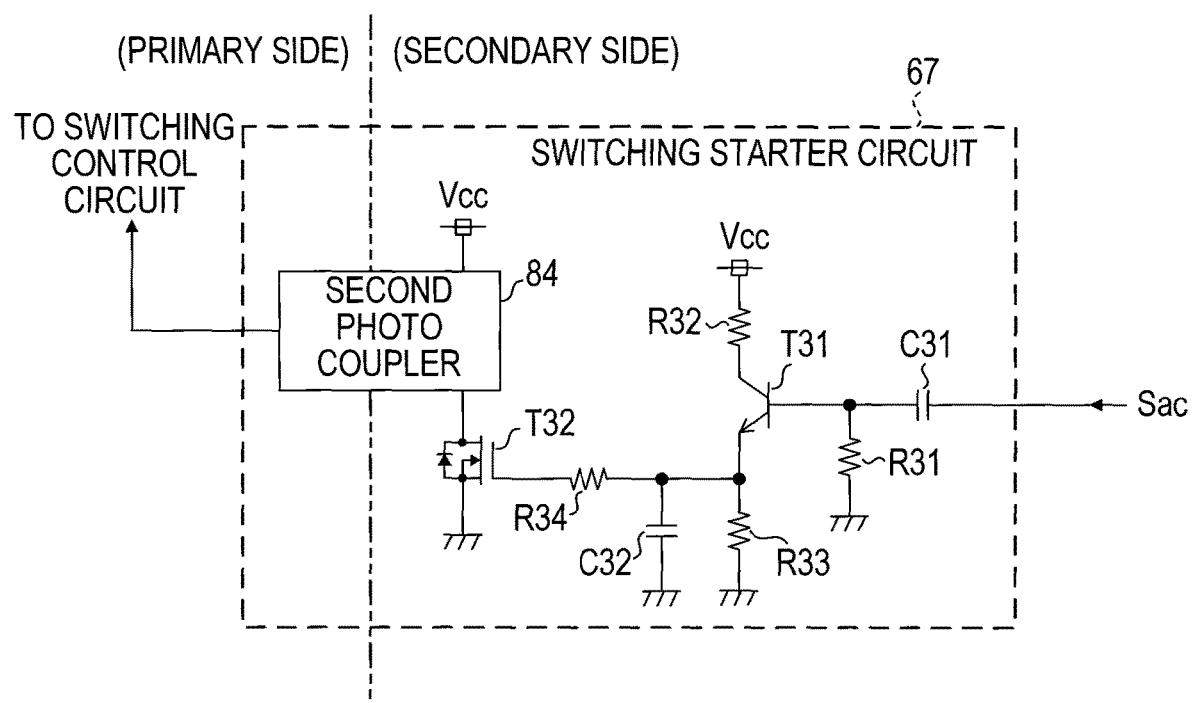
FIG. 4 is an electric circuit diagram showing a specific configuration of a switching starter circuit in the charger.

As shown in FIG. 4, the switching starter circuit 67 includes resistors R31, R32, R33, R34; capacitors C31, C32; switching elements T31, T32; and a second photocoupler 84. The switching element T31 is, for example, an NPN bipolar transistor in the present embodiment. The switching element T32 is, for example, an n-channel Metal Oxide Semiconductor Field-Effect Transistor (MOSFET) in the present embodiment.

The switching start signal Sac from the charging control circuit 60, that is, the pulse signal is inputted to a base of the switching element T31 through a differentiation circuit, including the capacitor C31 and the resistor R31. The first power supply voltage Vcc is applied to a collector of the switching element T31 through the resistor R32.

An emitter of the switching element T31 is connected to the ground line through the resistor R33, and is connected to a gate of the switching element T32 through the resistor R34. The capacitor C32 is connected, in parallel with the resistor R33, between the emitter of the switching element T31 and the ground line. A source of the switching element T32 is connected to the ground line. A drain of the switching element T32 is connected to a secondary side (that is, a not-shown light emitting diode) of the second photocoupler 84.

Without input of the switching start signal Sac to the switching starter circuit 67, the switching elements T31, T32 are OFF. In this case, the second photocoupler 84 outputs the stop signal to the switching control circuit 54c. While the switching start signal Sac is inputted to the switching starter circuit 67, the switching element T31 is periodically turned on and off in accordance with the frequency of the switching start signal Sac.

The circuit including the resistors R32, R33 and the capacitor C32 functions as an integral circuit. Specifically, in response to turning-on of the switching element T31, the capacitor C32 is charged by the first power supply voltage Vcc. The capacitor C32 is charged in accordance with a time constant T1 based on the resistance value of the resistor R32 and an electrostatic capacitance of the capacitor C32. In response to turning-off of the switching element T31, a charged electric charge in the capacitor C32 is discharged. The charged electric charge is discharged through the resistor R33 in accordance with a time constant $\tau 2a$ based on the resistance value of the resistor R33 and an electrostatic capacitance of the capacitor C32. The time constant τ1 is less than a time constant τ2. An input impedance of the gate of the switching element T32 is considerably great, and thus, electric current inputted to the gate is zero or almost zero.

While the switching start signal Sac is inputted to the switching starter circuit 67, the capacitor C32 is charged as described above; thus, a gate voltage value of the switching element T32 is maintained at a value that allows turning-on of the switching element T32. As a result, the switching element T32 is turned on, and the second photocoupler 84 outputs the start signal.

While the switching start signal Sac is not inputted to the switching starter circuit 67, the switching element T31 remains OFF. Thus, the charged electric charge in the capacitor C32 is discharged through the resistor R33, and the switching element T32 also remains OFF. In this case, the second photocoupler 84 outputs the stop signal. The start signal and the stop signal are outputted from a primary side output circuit, including a not-shown phototransistor, in the second photocoupler 84.

In the present embodiment, the switching start signal Sac is not a constant direct-current signal but a pulse signal. The switching start signal Sac is inputted to a base of the switching element T31 through the above-described differentiation circuit.

The differentiation circuit maintains the switching element T31 OFF even if input error has occurred. Input error is an event in which the voltage value of an input terminal of the switching starter circuit 67 is fixed to a value that allows turning-on of the switching element T31 without input of the switching start signal Sac to the switching starter circuit 67. The input terminal receives the switching start signal Sac. While the switching element T31 remains OFF, the switching element T32 also remains OFF. As described above, the switching starter circuit 67 of the present embodiment is configured to inhibit the switching elements T31 and T32 from remaining ON despite occurrence of the aforementioned error.

A rectifier circuit 65 and a smoothing circuit 66 are provided between the main converter 54 and the line switch circuit 58 in the positive electrode line 55. Since the main converter 54 of the present embodiment is an insulated converter, charging power outputted from the main converter 54 is alternating power. The rectifier circuit 65 rectifies the charging power, which is alternating power, outputted from the main converter 54. The smoothing circuit 66 smooths the charging power rectified by the rectifier circuit 65.

A diode D01 is provided between the line switch circuit 58 and the cell group switching circuit 57 in the positive electrode line 55. The diode D01 inhibits reverse flow of electric current from the positive terminal 41 or the center terminal 43 to the line switch circuit 58 and the precharging circuit 59.

The charger 40 further includes a sub-converter 68. The sub-converter 68 converts the above-described direct current power to power-supply power. The power-supply power has a voltage value that is different from an output voltage value of the main converter 54. The sub-converter 68 includes, for example, an insulated step-down switching power supply circuit in the present embodiment.

The power-supply power outputted from the sub-converter 68 is inputted to a power-supply circuit 69. The power-supply circuit 69 generates the first power supply voltage Vcc and a second power-supply voltage VD from the inputted power-supply power. The first power supply voltage Vcc has a value (for example, 5 V) that is less than a value (for example, 12 V) of the second power-supply voltage VD. The first power supply voltage Vcc is used as a power source for various components, including the charging control circuit 60, in the charger 40. The second power-supply voltage VD is used as a power source for, for example, not-shown fan and buzzer.

The charger 40 further includes an ES input circuit 74 and a communication circuit 75. The ES input circuit 74 is connected to the ES terminal 44. The communication circuit 75 is connected to the communication terminal 45.

The ES input circuit 74 receives input of an ES command from the battery pack 10 through the ES terminal 44. The ES input circuit 74 outputs an ES signal corresponding to the ES command. The ES signal includes an ES permission signal or an ES prohibition signal. More specifically, in response to input of the ES permission command to the ES terminal 44, the ES input circuit 74 outputs the ES permission signal. In response to input of the ES prohibition command to the ES terminal 44, the ES input circuit 74 outputs the ES prohibition signal. The ES permission signal and the ES prohibition signal each may be any signal. In the present embodiment, the ES permission signal is a LOW-level signal, and the ES prohibition signal is a HIGH-level signal.

The ES signal outputted from the ES input circuit 74 is inputted to the charging control circuit 60, the line switch circuit 58, and the precharging circuit 59.

The communication circuit 75 receives data transmitted from the battery pack 10 through the communication terminal 45, and relays the received data to the charging control circuit 60. The charging control circuit 60 outputs, to the communication circuit 75, data to be transmitted to the battery pack 10. The communication circuit 75 transmits the data inputted from the charging control circuit 60 to the battery pack 10 through the communication terminal 45.

As shown in FIG. 5, the line switch circuit 58 includes switching elements T01, T02, a charge pump circuit 58a, and a forcible interruption circuit 58b.

The switching elements T01, T2 are provided in the positive electrode line 55 to establish or interrupt the positive electrode line 55. The switching elements T01 and T2 are connected in series to each other. Specifically, a drain of the switching element T01 is connected to the smoothing circuit 66 (see FIG. 2), and receives input of charging power. A source of the switching element T01 is connected to a source of the switching element T02. A drain of the switching element T02 is connected to the cell group switching circuit 57 through the diode D01 (see FIG. 2). Respective gates of the switching element T01 and T02 are connected to each other.

Accordingly, the positive electrode line 55 is established while the switching elements T01 and T02 are ON, and is interrupted while the switching element T01 and/or the switching element T02 is OFF. The switching elements T01 and T02 are each, for example, an n-channel MOSFET in the present embodiment.

The charge pump circuit 58a includes resistors R01, R02, R03, R04, R05, and R06; capacitors C01 and C02; diodes D11, D12, D13, and D14; and switching elements T03 and T04. The switching element T03 is, for example, a PNP bipolar transistor in the present embodiment. The switching element T04 is, for example, an NPN bipolar transistor in the present embodiment.

The resistor R01 and the capacitor C01 are connected between the gate and the source of the switching element T01 (that is, between the gate and the source of the switching element T02).

The second power-supply voltage VD is applied to an emitter of the switching element T03. The resistor R03 is connected between a base and an emitter of the switching element T03. A collector of the switching element T03 is connected to an anode of the diode D11. A cathode of the diode D11 is connected to an anode of the diode D13. A cathode of the diode D13 is connected to the gate of the switching elements T01 and T02 through the resistor R05.

The cathode of the diode D11 is further connected to a first terminal of the capacitor C02. A second terminal of the capacitor C02 is connected to an anode of the diode D14. A cathode of the diode D14 is connected to a collector of the switching element T04 through the resistor R06. The resistor R02 is connected between the drain of the switching element T02 and the anode of the diode D14.

A base of the switching element T03 is further connected to a first terminal of the resistor R04, A second terminal of the resistor R04 is connected to an anode of the diode D12. A cathode of the diode D12 is connected to the cathode of the diode D14.

An emitter of the switching element T04 is connected to the ground line. A base of the switching element T04 receives input of the first drive signal Sd1 from the charging control circuit 60.

The forcible interruption circuit 58b includes resistors R07, R08, and R09; a capacitor C03; a diode D15; and a switching element T05. The switching element T05 is, for example, an n-channel MOSFET in the present embodiment.

An anode of the diode D15 is connected to the ES input circuit 74 (see FIG. 2), and receives input of the ES signal (the ES permission signal or the ES prohibition signal) from the ES input circuit 74. A cathode of the diode D15 is connected to a gate of the switching element T05 through the resistor R09. A source of the switching element T05 is connected to the ground line. The resistor R08 and the capacitor C03 are connected between the gate and the source of the switching element T05. A drain of the switching element T05 is connected to the gate of the switching elements T01 and T02 through the resistor R07.

Upon input of the ES permission signal (that is, a LOW-level signal) to the forcible interruption circuit 58b, the switching element T05 is turned off. In this case, the forcible interruption circuit 58b does not affect the operation of the switching element T01 or T02. Specifically, the switching element T01 and T02 are each turned on or off depending on whether the first drive signal Sd1 is inputted to the line switch circuit 58.

Upon input of the ES prohibition signal (that is, a HIGH-level signal) to the forcible interruption circuit 58b, the switching element T05 is turned on. In this case, a potential at the gate of the switching elements T01 and T02 is the same or close to a potential of the ground line. Thus, even if the first drive signal Sd1 is inputted to the line switch circuit 58, the switching elements T01 and T02 are forcibly turned off. In other words, the first drive signal Sd1 is disabled, while the ES prohibition signal is inputted in the line switch circuit 58.

Upon input of the first drive signal Sd1 to the line switch circuit 58 while the ES permission signal is inputted to the forcible interruption circuit 58b, the switching element T04 is periodically turned on and off in accordance with a frequency of the first drive signal Sd1. In response to the periodical turning-on and turning-off of the switching element T04 by the first drive signal Sd1, the charge pump circuit 58a operates. Specifically, the charge pump circuit 58a increases voltages of gates of the switching elements T01 and T02. Thus, the switching elements T01 and T02 are turned on (that is, the line switch circuit 58 is turned on).

The forcible interruption circuit 58b forcibly turns off the line switch circuit 58 in response to input of the ES prohibition signal through hardware processing without performing software processing.

The diode D12 inhibits inflow of part of the charging current, which flows through the positive electrode line 55, into the supply path of the second power-supply voltage VD. In the present embodiment, during normal charging by the charging control circuit 60, the charging voltage value Vch is within a specified range, including, for example, 30 V. In the present embodiment, a value of the second power-supply voltage VD is 12 V, which is less than the charging voltage value Vch and is greatly different from the charging voltage value Vch.

As a result, if the diode D12 is not provided, part of the charging current outputted from the drain of the switching element T02 might flow into the power-supply circuit 69 through the resistor R02, the diode D14, the resistor R04, and the resistor R03. Thus, the diode D12 is provided in the present embodiment, in order to inhibit inflow of part of the charging current into the power-supply circuit 69 as described above.

As shown in FIG. 5, the precharging circuit 59 includes resistors R11, R12, R14, R15, and R16; a diode D21, switching elements T11 and T12, a limiter circuit 59a, and a forcible interruption circuit 59b. The limiter circuit 59a includes a resistor R13 and a switching element T13. The switching elements T11, T13 are each, for example, a PNP bipolar transistor in the present embodiment. The switching element T12 is, for example, an NPN bipolar transistor in the present embodiment.

An emitter of the switching element T11 is connected to the positive electrode line 55 (specifically, upstream from the line switch circuit 58) through the resistor R13. Thus, the charging power outputted from the main converter 54 is inputted to the emitter of the switching element T11 through the limiter circuit 59a. In the limiter circuit 59a, an emitter of the switching element T13 is connected to the positive electrode line 55. A base of the switching element T13 is connected to the emitter of the switching element T11. A collector of the switching element T13 is connected to a base of the switching element T11. The resistor R11 is connected between the emitter and the base of the switching element T11.

A collector of the switching element T11 is connected to an anode of the diode D21. A cathode of the diode D21 is connected to the positive electrode line 55 (specifically, downstream from the line switch circuit 58) through the resistor R12.

The base of the switching element T11 is connected to a collector of the switching element T12 through the resistor R14. An emitter of the switching element T12 is connected to the ground line. The second drive signal Sd2 is inputted to a base of the switching element T12 through the resistor R16. The resistor R15 is connected between the base and the emitter of the switching element T12.

The forcible interruption circuit 59b is configured similarly to the forcible interruption circuit 58b in the line switch circuit 58. In the forcible interruption circuit 59b, the drain of the switching element T05 is connected to the base of the switching element T12 through the resistor R07.

In a case where the ES permission signal (that is, a LOW-level signal) is inputted to the forcible interruption circuit 59b, and the switching element T05 is OFF, the forcible interruption circuit 59b does not affect the operation of the switching element T12. In other words, the switching element T12 is turned on or off depending on whether the second drive signal Sd2 is inputted to the precharging circuit 59.

In response to turning-on of the switching element T05 due to input of the ES prohibition signal (that is, a HIGH-level signal) to the forcible interruption circuit 59b, a potential of the base of the switching element T12 becomes the same as or close to the potential of the ground line. Thus, the switching element T12 is forcibly turned off even if the second drive signal Sd2 is inputted to the precharging circuit 59. In other words, while the ES prohibition signal is inputted to the precharging circuit 59, the second drive signal Sd2 from the charging control circuit 60 is disabled.

If the second drive signal Sd2 is inputted to the precharging circuit 59 while the ES permission signal is inputted to the forcible interruption circuit 59b, then the switching element T12 is turned on. In response to turning-on of the switching element T12, the switching element T11 is turned on. In response to turning-on of the switching element T11, the charging current outputted from the main converter 54 is outputted to the battery pack 10 through the switching element T11.

The forcible interruption circuit 59b forcibly turns off the precharging circuit 59 in response to input of the ES prohibition signal through hardware processing without performing software processing. More specifically, for example, the precharging circuit 59 is kept off while the ES prohibition signal is inputted in the present embodiment.

The limiter circuit 59a limits the value of the charging current to be outputted from the precharging circuit 59 to the aforementioned specified level or less (for example, 200 mA or less). That is, the limiter circuit 59a is configured to cause the switching element T13 to be turned on if the value of the charging current inputted to the limiter circuit 59a exceeds the aforementioned specified level. In response to turning-on of the switching element T13, the switching element T11 is turned off, thereby stopping output of the charging current from the precharging circuit 59.

Upon receiving input of the ES prohibition signal while outputting the first drive signal Sd1 or the second drive signal Sd2, the charging control circuit 60 stops output of the first drive signal Sd1 or the second drive signal Sd2 through software processing. However, there is a certain time lag between the input of the ES prohibition signal to the charging control circuit 60 and stopping the output of the first drive signal Sd1 or the second drive signal Sd2 by the charging control circuit 60 through software processing.

In the present embodiment, however, upon output of the ES prohibition signal from the ES input circuit 74, the line switch circuit 58 and the precharging circuit 59 are forcibly turned off through hardware processing by the forcible interruption circuits 58b and 59b before the charging control circuit 60 stops output of the first drive signal Sd1 or the second drive signal Sd2 through software processing.

Upon activation by supply of the first power supply voltage Vcc to the charging control circuit 60, the charging control circuit 60 executes a charger main process (see FIG. 7 and FIG. 8) described below. The charger main process includes a self-diagnosis process (or a self check) (including S140 in FIG. 7 to S300 in FIG. 8) and the above-described second charging control process (S310 in FIG. 8) to charge the battery 20.

In the charger main process, the charging control circuit 60 first executes the self-diagnosis process upon detection of attachment of the battery pack 10 to the charger 40. The self-diagnosis process is a process to diagnose whether the charger 40 operates properly. In the present embodiment, the self-diagnosis process includes a first check to a fifth check described below. Upon obtaining a diagnosis result that the charger 40 operates properly in the self-diagnosis process, the charging control circuit 60 executes the second charging control process. The diagnosis result that the charger 40 operates properly includes, for example, proper results in all of the first check to the fifth check.

The charging control circuit 60 controls supply of the charging power to the battery 20 in the second charging control process, while performing data communication with the battery pack 10, thereby charging the battery 20. Specifically, the charging control circuit 60 obtains various information, including the charging current command value regarding charging of the battery 20, from the battery pack 10. The charging control circuit 60 controls supply of the charging power to the battery 20 based on the obtained various information.

The charging control circuit 60 starts charging of the battery 20 in a case where charging of the battery 20 is required and the ES permission signal is inputted. Specifically, the charging control circuit 60 outputs the switching start signal Sac, thereby activating the switching control circuit 54c of the main converter 54.

Subsequently, the charging control circuit 60 determines which of normal charging or precharging should be performed, based on the current battery voltage value. Upon determining to perform normal charging, the charging control circuit 60 outputs the first drive signal Sd1 to the line switch circuit 58, thereby turning on the line switch circuit 58. Upon determining to perform precharging, the charging control circuit 60 outputs the second drive signal Sd2 to the precharging circuit 59, thereby activating the precharging circuit 59.

The charging control circuit 60 also sets the CV setting value Dcv depending on whether normal charging is performed or precharging is performed, and outputs the CV setting value Dcv to the CV setting circuit 81. The charging control circuit 60 further outputs a PWM signal corresponding to the charging current command value obtained from the battery pack 10, as well as outputs the FB enabling signal Sfb.

As a result, charging power is generated in the main converter 54. By output of the charging power to the battery pack 10, the battery 20 is charged. The charging power outputted from the main converter 54 is outputted to the battery pack 10 through the line switch circuit 58 during normal charging, while being outputted to the battery pack 10 through the precharging circuit 59 during precharging.

The charging control circuit 60 charges the battery 20 while alternately switching the cell group switching circuit 57 between a first connection state and a second connection state. That is, the charging control circuit 60 performs charging of the first cell group 21 and charging of the second cell group 22 in parallel. Switching between the first connection state and the second connection state may be performed at any timing, and may be, for example, at specified time intervals (for example, once per minute).

If the ES prohibition signal is inputted, then the charging control circuit 60 does not charge the battery 20. Specifically, if the ES prohibition signal is inputted, the charging control circuit 60 does not output the first drive signal Sd1, the second drive signal Sd2, the switching start signal Sac, the FB enabling signal, or the PWM signal. In this case, the main converter 54 stops, and charging power is not generated.

(4) Configuration of Working Machine Main Body

As shown in FIG. 3, the working machine main body 200 includes a positive terminal 201, a negative terminal 202, an ES terminal 204, and a communication terminal 205.

Upon attachment of the battery pack 10 to the working machine main body 200, these terminals of the working machine main body 200 are connected to the terminals of the battery pack 10 as described below. The positive terminal 201 is connected to the positive terminal 11 of the battery pack 10. The negative terminal 202 is connected to the negative terminal 12 of the battery pack 10. The ES terminal 204 is connected to the ES terminal 14 of the battery pack 10. The communication terminal 205 is connected to the communication terminal 15 of the battery pack 10.

The working machine main body 200 further includes a motor drive circuit 211, a motor 212, a drive mechanism 213, an output tool 214, a drive switch 215, a switch drive circuit 216, a manipulator 217, a manipulation detection circuit 218, a drive control circuit 220, an ES input circuit 224, a communication circuit 225, and a power-supply circuit 230.

The battery power is supplied to the motor drive circuit 211 from the positive terminal 201 and the negative terminal 202. The motor drive circuit 211 supplies electric power to the motor 212 based on a drive command inputted from the drive control circuit 220. The motor 212 is rotated by the electric power supplied from the drive control circuit 220. The drive mechanism 213 transmits the rotation of the motor 212 to the output tool 214. The output tool 214 is driven by a rotational force of the motor 212 through the drive mechanism 213. The output tool 214 is configured to achieve a function of the electric working machine by acting on a work target outside the working machine body 200. The output tool 214 may be, for example, a rotary blade for cutting grass, small-diameter trees, and so on. Alternatively, the output tool 214 may be, for example, a drill bit for making a hole in a workpiece. Still alternatively, the output tool 214 may be, for example, a blade for blowing or sucking air.

The drive switch 215 is arranged in the current path between the positive terminal 201 and the motor drive circuit 211 to establish or interrupt the current path. The drive switch 215 is controlled by the drive control circuit 220 through the switch drive circuit 216.

The manipulator 217 is manipulated by a user of the electric working machine. The manipulation detection circuit 218 detects the user's manipulation of the manipulator 217. Upon detection of the user's manipulation, the manipulation detection circuit 218 outputs a manipulation detection signal to the drive control circuit 220. Upon receiving input of the manipulation detection signal, the drive control circuit 220 turns on the drive switch 215 and drives the motor drive circuit 211, thereby rotating the motor 212.

The power-supply circuit 230 converts a battery voltage Vb to a control power-supply voltage Vdm, which is a direct voltage. The control power-supply voltage Vdm has a voltage value less than the battery voltage Vb. Components, including the drive control circuit 220, in the working machine main body 200 are operated with the control power-supply voltage Vdm.

The ES input circuit 224 is connected to the ES terminal 204. The communication circuit 225 is connected to the communication terminal 205.

In the present embodiment, the ES input circuit 224 has the same configuration as the ES input circuit 74 in the charger 40. Specifically, the ES input circuit 224 outputs the ES permission signal or the ES prohibition signal described above. The ES prohibition signal is inputted to the drive control circuit 220 and to the switch drive circuit 216

If the ES permission signal is inputted to the drive control circuit 220, then the drive control circuit 220 drives the motor 212 in accordance with the manipulation of the manipulator 217. If the ES prohibition signal is inputted to the drive control circuit 220, then the drive control circuit 220 stops operation of the motor drive circuit 211 and turns off the drive switch 215 even if the manipulator 217 is manipulated. If the ES permission signal is inputted to the switch drive circuit 216, then the switch drive circuit 216 enables control of the drive switch 215 by the drive control circuit 220. However, if the ES prohibition signal is inputted to the switch drive circuit 216, the switch drive circuit 216 disables the control of the drive switch 215 by the drive control circuit 220, and forcibly turns off the drive switch 215.

The communication circuit 225 receives data transmitted from the battery pack 10 through the communication terminal 205, and relays the received data to the drive control circuit 220. The communication circuit 225 transmits the data outputted from the drive control circuit 220 to the battery pack 10 through the communication terminal 205.

(5) Self-Diagnosis Process

A specific description will next be given of the self-diagnosis process executed by the charging control circuit 60 with reference to FIG. 6. In the present embodiment, the charging control circuit 60 performs data communication with the battery pack 10 and intentionally changes a state of the battery pack 10 through the data communication in the self-diagnosis process. The charging control circuit 60 performs at least one check both before and after the change in the state of the battery pack 10. More specifically, the charging control circuit 60 performs the first to fifth checks sequentially in the present embodiment. While sequentially performing the first to fifth checks, the charging control circuit 60 changes the state of the battery pack 10. The self-diagnosis process is started while the ES permission command is inputted from the battery pack 10, that is, while the ES permission signal is outputted from the ES input circuit 74.

Figure 6:
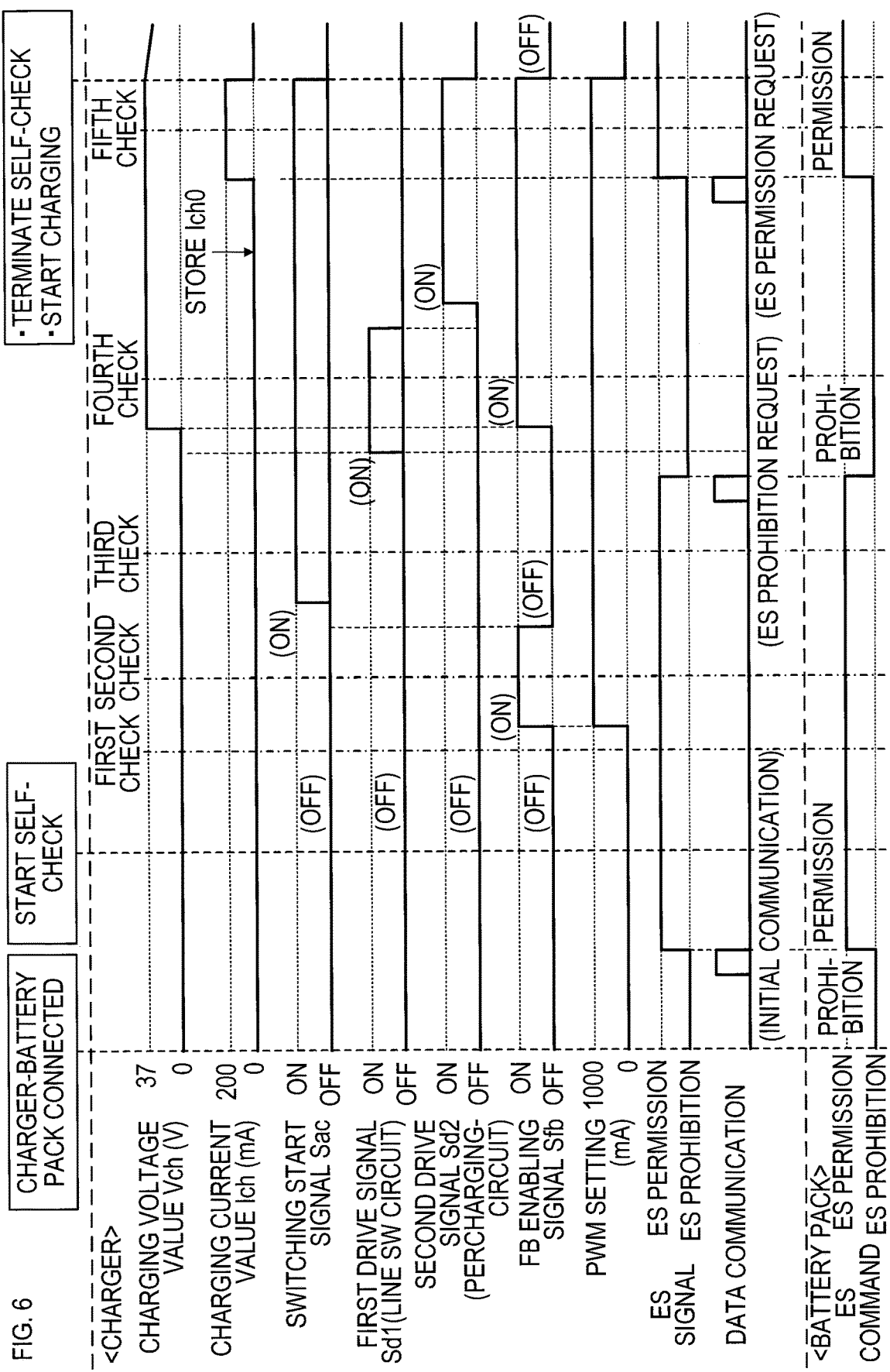
FIG. 6 is a time chart showing an example performance of a self-diagnosis in the charger.

As shown in FIG. 6, upon attachment of the battery pack 10 to the charger 40, the charging control circuit 60 performs data communication (an initial communication process described below) with the battery pack 10 before starting the self-diagnosis process. By performing the initial communication process, the charging control circuit 60 causes the battery pack 10 to recognize the attachment of the battery pack 10 to the charger 40.

Before the attachment of the battery pack 10 to the charger 40, the battery pack 10 outputs the ES prohibition command from the ES terminal 14. Upon recognizing the attachment of the battery pack 10 to the charger 40 through the data communication with the charger 40, the battery pack 10 outputs the ES permission command from the ES terminal 14 as shown in FIG. 6.

As shown in FIG. 6, while the ES prohibition command is outputted from the battery pack 10, the ES signal to be inputted to the charging control circuit 60 is the ES prohibition signal. Upon output of the ES permission command from the battery pack 10, the ES signal to be inputted to the charging control circuit 60 is changed to the ES permission signal. The charging control circuit 60 starts the self-diagnosis process upon input of the ES permission signal to the charging control circuit 60 after performing the initial communication process, After starting the self-diagnosis process, the charging control circuit 60 first performs the first check.

A main purpose of the first check is to confirm whether the switching control circuit 54c in the main converter 54 operates properly.

The charging control circuit 60 sets the charger 40 to an initial state, and performs the first check. As shown in FIG. 6, in the initial state, the switching start signal Sac, the FB enabling signal Sfb, the first drive signal Sd1 and the second drive signal Sd2 are OFF, and also a set value of the PWM signal is set to 0 mA. In the present embodiment, ON of a signal means outputting the signal, and OFF of a signal means not outputting the signal.

If no faulty state of the switching control circuit 54c is present during the first check, then the switching control circuit 54c does not operate, and the main switch 54b remains OFF. In this case, the charging current value Ich and the charging voltage value Vch are each a value of zero or close to zero.

If a faulty state of the switching control circuit 54c is present, and the switching control circuit 54c, for example, runs away, a charging power may be outputted from the main converter 54. In this case, a charging voltage value Vth may increase, for example, to the same value as that during the normal charging (for example, approximately 37 V) or greater, thereby increasing a charging current value Ith.

Thus, the charging control circuit 60 obtains the charging voltage value Vch and the charging current value Ich, and performs the first check based on these values. The charging control circuit 60 obtains the charging current value Ich based on the current detection signal Si inputted to the charging control circuit 60, and obtains the charging voltage value Vch based on the charging voltage signal inputted to the charging control circuit 60.

The charging control circuit 60 determines that the switching control circuit 54c operates properly if the charging voltage value Vch is less than a first voltage threshold Vth1, and also the charging current value Ich is less than a first current threshold Ith1. In this case, the charging control circuit 60 determines a result of the first check as being normal. The charging control circuit 60 determines that the switching control circuit 54c does not operate properly if the charging voltage value Vch is equal to or greater than the first voltage threshold Vth1, or the charging current value Ich is equal to or greater than the first current threshold Ith1. In this case, the charging control circuit 60 determines a result of the first check as being improper.

The first voltage threshold Vth1 and the first current threshold Ith1 may be any value. In the present embodiment, for example, the first voltage threshold Vth1 is 30 V, and the first current threshold Ith1 is 0.5 A.

If the result of the first check is "normal", then the charging control circuit 60 performs the second check. A main purpose of the second check is to confirm whether the switching start signal Sac functions properly. Proper function of the switching start signal Sac means that no charging power is outputted from the main converter 54 while the switching start signal Sac is OFF (in other words, a stop signal is outputted from the switching starter circuit 67).

The charging control circuit 60 makes various setting changes for performing the second check, and then performs the second check. As shown in FIG. 6, the various setting changes for performing the second check includes turning-off of the switching start signal Sac, the first drive signal Sd1, and the second drive signal Sd2; turning-on of the FB enabling signal Sfb; and setting a set value of the PWM signal to a specified value (for example, 1000 mA) that may be set during the normal charging.

Upon various setting changes for performing the second check, the switching control signal to generate a charging current of 1000 mA is inputted from the output setting circuit 64 to the switching control circuit 54c. However, the switching start signal Sac is OFF, the switching starter circuit 67, if in a non-faulty state, outputs the stop signal. Upon input of the stop signal from the switch starter circuit 67, the switching control circuit 54c, if in a non-faulty state, is not activated. In other words, if the switching start signal Sac functions properly, then the switching control circuit 54c is not activated. Thus, the charging current value Ich and the charging voltage value Vch are each a value of zero or close to zero.

If the switching start signal Sac does not function properly, and the switching control circuit 54c operates based on the switching control signal despite turning-off of the switching start signal Sac, then charging power may be generated. In this case, the charging voltage value Vth may be the same value as that during the normal charging (for example, approximately 37 V), and the charging current value Ith may be a value (for example, approximately 1 A) corresponding to a set value of the PWM signal.

Accordingly, the charging control circuit 60 obtains the charging current value Ich and the charging voltage value Vch in the second check, similarly to the first check. The charging control circuit 60 determines that the switching start signal Sac functions properly if the charging voltage value Vch is less than the first voltage threshold Vth1, and also the charging current value Ich is less than the first current threshold Ith1. In this case, the charging control circuit 60 determines a result of the second check as being normal. The charging control circuit 60 determines that the switching start signal Sac does not function properly if the charging voltage value Vch is equal to or greater than the first voltage threshold Vth1, or the charging current value Ich is equal to or greater than the first current threshold Ith1. In this case, the charging control circuit 60 determines a result of the second check as being improper.

If the result of the second check is normal, then the charging control circuit 60 performs the third check. A main purpose of the third check is to confirm whether the FB enabling signal Sfb functions properly. Proper function of the FB enabling signal Sfb means that charging current is not outputted from the main converter 54 while the FB enabling signal Sfb is OFF (in other words, the switching control signal is not outputted from the first photocoupler 83).

The charging control circuit 60 makes various setting changes for performing the third check, and then performs the third check. As shown in FIG. 6, various setting changes for performing the third check includes turning-off of the FB enabling signal Sfb, and turning-on of the switching start signal Sac after turning-off of the FB enabling signal Sfb.

Upon the various setting changes for performing the third check, if the FB enabling signal Sfb functions properly, the output setting circuit 64 disables the differential signal Dif, and outputs the switching control signal to stop output of the charging current.

If the FB enabling signal Sfb does not function properly, the switching control signal in accordance with the differential signal Dif may be outputted from the first photocoupler 83, and the switching control circuit 54c may operate in accordance with the switching control signal. Reasons that the FB enabling signal Sfb does not function properly may include, for example, a faulty state in a transmission path of the FB enabling signal Sfb from the charging control circuit 60 to the first photocoupler 83, and a faulty state of the first photocoupler 83. If the switching control circuit 54c operates based on the switching control signal in accordance with the differential signal Dif, then the charging voltage value Vth may be the same as that during normal charging (for example, approximately 37 V), and the charging current value Ith may be a value (for example, approximately 1 A) corresponding to a set value of the PWM signal.

Accordingly, the charging control circuit 60 obtains the charging current value Ich and the charging voltage value Vch in the third check, similarly to the first check. The charging control circuit 60 determines that the FB enabling signal Sfb functions properly if the charging voltage value Vch is less than the first voltage threshold Vth1, and also the charging current value Ich is less than the first current threshold Ith1. In this case, the charging control circuit 60 determines a result of the third check as being normal. The charging control circuit 60 determines that the FB enabling signal Sfb does not function properly if the charging voltage value Vch is equal to or greater than the first voltage threshold Vth1, or the charging current value Ich is equal to or greater than the first current threshold Ith1. In this case, the charging control circuit 60 determines the result of the third check as being improper.

If the result of the third check is normal, then the charging control circuit 60 performs the fourth check. A main purpose of the fourth check is to confirm whether the line switch circuit 58 is forcibly turned off through hardware processing (that is, by the forcible interruption circuit 58b) in response to input of the ES prohibition command from the battery pack 10, even if the charging control circuit 60 outputs the first drive signal Sd1.

The charging control circuit 60 makes various setting changes for performing the fourth check, and then perform the fourth check. As shown in FIG. 6, the various setting changes for performing the fourth check include intentionally causing the battery pack 10 to output the ES prohibition command. Specifically, the charging control circuit 60 transmits an ES prohibition request to the battery pack 10 by data communication. The ES prohibition request requests the battery pack 10 to output the ES prohibition command. In other words, the ES prohibition request requests the battery control circuit 23 to output a prohibition command. Upon receipt of the ES prohibition request from the charger 40, the battery control circuit 23 outputs the prohibition command to the ES output circuit 24 even if the battery pack 10 is not in a specific faulty state. Thus, upon transmission of the ES prohibition request to the battery pack 10, the ES prohibition command is outputted from the ES terminal 14 of the battery pack 10. As a result, the ES prohibition command is inputted to the ES terminal 44 of the charger 40, and the ES prohibition signal is outputted from the ES input circuit 74. As shown in FIG. 6, the various setting changes for performing the fourth check further include sequentially turning on the first drive signal Sd1 and the FB enabling signal Sfb.

Upon the various setting changes for performing the fourth check, if the ES prohibition signal functions properly (that is, the forcible interruption circuit 58b operates properly in accordance with the ES prohibition signal), the line switch circuit 58 is forcibly turned off even if the first drive signal Sd1 is outputted. In this case, the charging power generated in the main converter 54 is not outputted from the line switch circuit 58. That is, although the charging voltage value Vch is the same as the value during normal charging (for example, approximately 37 V), the charging current value Ith is a value of zero or close to zero.

If the ES prohibition signal does not function properly, the line switch circuit 58 may not be turned off by the hardware processing in accordance with the ES prohibition signal. Reasons that the ES prohibition signal does not function properly may include, for example, a faulty state of the forcible interruption circuit 58b, and no input of the ES prohibition signal to the forcible interruption circuit 58b. If the line switch circuit 58 is not turned off by the hardware processing, then the charging current value Ith may be a value (for example, approximately 1 A) corresponding to a set value of the PWM Accordingly, the charging control circuit 60 obtains the charging current value Ich and the charging voltage value Vch in the fourth check. The charging control circuit 60 determines that the line switch circuit 58 is turned off properly by the ES prohibition command if the charging voltage value Vch is equal to or greater than a second voltage threshold Vth2, and also the charging current value Ich is less than the first current threshold Ith1. In this case, the charging control circuit 60 determines a result of the fourth check as being normal. The charging control circuit 60 determines that the line switch circuit 58 is not turned off properly by the ES prohibition command if the charging voltage value Vch is less than the second voltage threshold Vth2, or the charging current value Ich is equal to or greater than the first current threshold Ith1. In this case, the charging control circuit 60 determines the result of the fourth check as being improper.

If the result of the fourth check is normal, then the charging control circuit 60 performs the fifth check. A main purpose of the fifth check is to confirm whether the pre-charging circuit 59 is forcibly turned off through hardware processing (that is, by the forcible interruption circuit 59b) in response to input of the ES prohibition command from the battery pack 10, even if the charging control circuit 60 outputs the second drive signal Sd2.

The charging control circuit 60 performs a check preparation process for performing the fifth check, and then performs the fifth check. The check preparation process includes a first preparation process, a second preparation process, and a third preparation process. As shown in FIG. 6, the first preparation process includes turning off the first drive signal Sd1 and turning on the second drive signal Sd2. The second preparation process is executed after execution of the first preparation process. The second preparation process includes obtaining the charging current value Ich and storing the obtained charging current value Ich as a charging current held value Ich0. If the ES prohibition signal functions properly, then the charging current held value Ich0 stored in the second preparation process is a value of zero or close to zero.

The third preparation process is executed after execution of the second preparation process. As shown in FIG. 6, the third preparation process includes transmitting an ES permission request to the battery pack 10 by data communication. Upon receipt of the ES permission request from the charger 40, the battery control circuit 23 outputting the prohibition command determines whether the specific faulty state is present in the battery pack 10. If the specific faulty state is not present, then the battery control circuit 23 outputs the permission command to the ES output circuit 24. Thus, upon transmission of the ES permission request to the battery pack 10, the ES permission command is outputted from the ES terminal 14 of the battery pack 10. As a result, the ES permission command is inputted to the ES terminal 44 of the charger 40, the ES permission signal is outputted from the ES input circuit 74.

After executing the check preparation process and confirming output of the ES permission signal, the charging control circuit 60 performs the fifth check. Specifically, the charging control circuit 60 first obtains the charging current value Ich at present. Then, the charging control circuit 60 determines whether a difference (hereinafter referred to as a "current deviation") between the obtained charging current value Ich and the charging current held value Ich0 stored in the second preparation process is greater than a second current threshold Ith2. If the current deviation is greater than the second current threshold Ith2, then the charging control circuit 60 determines that the precharging circuit 59 is forcibly turned off in accordance with the ES prohibition command. In this case, the charging control circuit 60 determines a result of the fifth check as being normal. If the current deviation is equal to or less than the second current threshold Ith2, then the charging control circuit 60 determines that the precharging circuit 59 is not forcibly turned off, even if the ES prohibition command is received. In this case, the charging control circuit 60 determines the result of the fifth check as being improper.

If the result of the fifth check is normal, then the charging control circuit 60 terminates the self-diagnosis process, and the charging control circuit 60 returns to an initial state. Specifically, as shown in FIG. 6, the charging control circuit 60 turns off the switching start signal Sac, the FB enabling signal Sfb, the first drive signal Sd1, and the second drive signal Sd2, and also sets the set value of the PWM signal to 0 mA. After terminating the self-diagnosis process, the charging control circuit 60 starts the charger charging control process to thereby start charging of the battery 20.

(6) Charger Main Process

A description will be given of the charger main process executed by the charging control circuit 60 with reference to FIG. 7 and FIG. 8. Upon activation of the charging control circuit 60, the charging control circuit 60 starts the charger main process.

After starting the charger main process, the charging control circuit 60 executes an initial process in S110, The initial process includes a process of setting the charger 40 in the initial state described above. Specifically, the charging control circuit 60 turns off the switching start signal Sac, the FB enabling signal Sfb, the first drive signal Sd1, and the second drive signal Sd2, and also sets the set value of the PWM signal to 0 mA (that is, sets the duty ratio of the PWM signal to, for example, zero).

In S120, the charging control circuit 60 determines whether the battery pack 10 is attached to the charger 40. While the battery pack 10 is not attached to the charger 40, the charging control circuit 60 repeatedly performs the determination in S120. Upon attachment of the battery pack 10 to the charger 40, the present process proceeds to S130.

In S130, the charging control circuit 60 executes an initial communication process. Specifically, the charging control circuit 60 performs data communication with the battery control circuit 23, to thereby cause the battery control circuit 23 to recognize that the battery pack 10 is attached to the charger 40. If the battery pack 10 is not attached to any device, then the battery control circuit 23 outputs the prohibition command to the ES output circuit 24. Upon recognizing that the battery pack 10 is attached to the charger 40, the battery control circuit 23 determines whether the battery pack 10 is in the specific faulty state. If the battery pack 10 is not in the specific faulty state, then the battery control circuit 23 outputs the permission command to the ES output circuit 24. As a result, the ES permission command is outputted from the ES terminal 14.

In S130, after performing the above-described data communication, the charging control circuit 60 waits for receiving the ES permission command from the battery pack 10. Upon confirming that the ES permission command is received from the battery pack 10 based on an input of the ES permission signal to the charging control circuit 60, the charging control circuit 60 proceeds to S140.

In S140, the charging control circuit 60 performs the first check. Specifically, the charging control circuit 60 obtains the charging voltage value Vch and the charging current value Ich, and determines whether the charging voltage value Vch is less than the first voltage threshold Vth1 (for example, 30 V) and also the charging current value Ich is less than the first current threshold Ith1 (for example, 0.5 A). If the charging voltage value Vch is equal to or greater than the first voltage threshold Vth1, or the charging current value Ich is equal to or greater than the first current threshold Ith1, then the present process proceeds to S320. In S320, the charging control circuit 60 determines the result of the first check as being improper, and executes a first error process. After executing the first error process in S320, the charging control circuit 60 terminates the charger main process.

If it is determined in S140 that the charging voltage value Vch is less than the first voltage threshold Vth1, and also the charging current value Ich is less than the first current threshold Ith1, then the charging control circuit 60 determines the result of the first check as being normal and proceeds to S150.

In S150, the charging control circuit 60 makes various setting changes as described above in order to perform the second check. Specifically, the charging control circuit 60 turns on the FB enabling signal Sfb, and also changes the set value of the PWM signal to the aforementioned specified value (for example, 1000 mA).

In 8160, the charging control circuit 60 performs the second check. Specifically, the charging control circuit 60 obtains the charging voltage value Vch and the charging current value Ich, and determines whether the charging voltage value Vch is less than the first voltage threshold Vth1 and also the charging current value Ich less than the first current threshold Ith1. If the charging voltage value Vch is equal to or greater than the first voltage threshold Vth1, or the charging current value Ich is equal to or greater than the first current threshold Ith1, then the present process proceeds to S330. In S330, the charging control circuit 60 determines the result of the second check as being improper, and executes a second error process. After executing the second error process in S330, the charging control circuit 60 terminates the charger main process.

In S160, if the charging voltage value Vch is less than the first voltage threshold Vth1, and also the charging current value Ich is less than the first current threshold Ith1, the charging control circuit 60 determines the result of the second check as being normal, and proceeds to S170.

In S170, the charging control circuit 60 makes the various setting changes for performing the third check. Specifically, the charging control circuit 60 first turns off the FB enabling signal Sib. Then, the charging control circuit 60 turns on the switching start signal Sac.

In S180, the charging control circuit 60 performs the third check. Specifically, the charging control circuit 60 obtains the charging voltage value Vch and the charging current value Ich, and determines whether the charging voltage value Vch is less than the first voltage threshold Vth1, and also the charging current value Ich is less than the first current threshold Ith1. If the charging voltage value Vch is equal to or greater than the first voltage threshold Vth1, or the charging current value Ich is equal to or greater than the first current threshold Ith1, then the present process proceeds to S340. In S340, the charging control circuit 60 determines the result of the third check as being improper, and executes the third error process. After executing the third error process in S340, the charging control circuit 60 terminates the charger main process.

In S180, if the charging voltage value Vch is less than the first voltage threshold Vth1, and also the charging current value Ich is less than the first current threshold Ith1, the charging control circuit 60 determines the result of the third check as being normal, and proceeds to S190.

In S190, the charging control circuit 60 transmits the ES prohibition request to the battery pack 10 by data communication. In S200, the charging control circuit 60 waits for a specified length of time. The specified length of time may be any length of time. The specified length of time may be, for example, a length of time longer than a time from a time point of transmitting the ES prohibition request to a time point of outputting the ES prohibition command from the battery pack 10 in response to the ES prohibition request.

In S210, the charging control circuit 60 determines whether output of the ES prohibition command from the battery pack 10 is confirmed. Specifically, the charging control circuit 60 determines that the ES prohibition command is outputted from the battery pack 10 upon input of the ES prohibition signal to the charging control circuit 60. If output of the ES prohibition command is not confirmed, then the charging control circuit 60 executes a first communication error process in S350, and terminates the charger main process. If output of the ES prohibition command is confirmed, then the charging control circuit 60 proceeds to S220 (see FIG. 8).

In S220, the charging control circuit 60 turns on the first drive signal Sd1, and then turns on the FB enabling signal Sfb. The charging control circuit 60 may turn on the FB enabling signal Sfb before turning on the first drive signal Sd1, or may turn on the first drive signal Sd1 and the FB enabling signal Sfb at the same time.

In S230, the charging control circuit 60 performs the fourth check. Specifically, the charging control circuit 60 obtains the charging voltage value Vch and the charging current value Ich, and determines whether the charging voltage value Vch is equal to or greater than the second voltage threshold Vth2, and also the charging current value Ich is less than the first current threshold Ith1. If the charging voltage value Vch is less than the second voltage threshold Vth2, or the charging current value Ich is equal to or greater than the first current threshold Ith1, then the present process proceeds to S360. In S360, the charging control circuit 60 determines the result of the fourth check as being improper, and performs the fourth error process. After executing the fourth error process in S360, the charging control circuit 60 terminates the charger main process.

In S230, if the charging voltage value Vch is equal to or greater than the second voltage threshold Vth2, and also the charging current value Ich is less than the first current threshold Ith1, the charging control circuit 60 determines the result of the fourth check as being proper, and proceeds to S240.

In S240, the charging control circuit 60 performs the first preparation process as described above. Specifically, the charging control circuit 60 turns off the first drive signal Sd1, and turns on the second drive signal Sd2. In S250, the charging control circuit 60 performs the second preparation process. Specifically, the charging control circuit 60 obtains the charging current value Ich, and stores the charging current value Ich as a charging current held value Ich0.

In S260, the charging control circuit 60 executes the third preparation process described above. Specifically, the charging control circuit 60 transmits the ES permission request to the battery pack 10 by data communication. In S270, the charging control circuit 60 waits for a specified length of time. The specified length of time may be any length of time. The specified length of time may be, for example, a length of time longer than a time from a time point of transmitting the ES permission request to a time point of outputting the ES permission command from the battery pack 10 in response to the ES permission request.

In S280, the charging control circuit 60 determines whether output of the ES permission command from the battery pack 10 is confirmed. Specifically, the charging control circuit 60 determines that the ES permission command is outputted from the battery pack 10 upon input of the ES permission signal to the charging control circuit 60. If output of the ES permission command is not confirmed, then the charging control circuit 60 executes a second communication error process in S370, and terminates the charger main process. If output of the ES permission command is confirmed, then the charging control circuit 60 proceeds to S290.

In S290, the charging control circuit 60 performs the fifth check. Specifically, the charging control circuit 60 calculates the above-described current deviation (the difference between the current charging current value Ich and the charging current held value Ich0), and determines whether the current deviation is greater than the second current threshold Ith2 (for example, 100 mA). If the current deviation is equal to or less than the second current threshold Ith2, then the charging control circuit 60 executes a fifth error process in S380, and terminates the charger main process. If the current deviation is greater than the second current threshold Ith2, then the charging control circuit 60 determines the result of the fifth check as being normal, and proceeds to S300.

In S300, the charging control circuit 60 terminates the self-diagnosis process in response to all the check results in the self-diagnosis process being normal, and executes a preparation process for charging of the battery 20. Specifically, the charging control circuit 60 returns to the initial state as described above. In other words, the charging control circuit 60 returns to a state immediately before the first check is performed. Then, the charging control circuit 60 executes the second charging control process in S310, thereby controlling the charging of the battery 20.

The first error process (S320), the second error process (S330), the third error process (S340), the fourth error process (S360), the fifth error process (S380), the first communication error process (S350), and the second communication error process (S370) each may be any process. For example, each process may include a process of displaying a corresponding determination result on a screen or notifying a corresponding determination result by audio.

(7) Battery Main Process

Next, a description will be given of a battery main process to be executed by the battery control circuit 23 of the battery pack 10 with reference to FIG. 9. Upon activation of the battery control circuit 23, the battery control circuit 23 starts the battery main process. The battery control circuit 23 is configured to output, upon its activation, the prohibition command to the ES output circuit 24.

After starting the battery main process, the battery control circuit 23 determines in S510 whether the battery pack 10 is connected to any external device (for example, the charger 40, the working machine main body 200, and so on). While the battery pack 10 is not connected to any external device, the battery control circuit 23 repeats the determination in S510. Upon connecting of the battery pack 10 to an external device, the present process proceeds to S520.

In the present embodiment, assume a situation where it is determined in S510 that the battery pack 10 is attached to an external device due to attachment of the battery pack 10 to the charger 40. Hereinafter, a description will be given of processes, included in the battery main process, to be executed in S520 and subsequent steps if the battery pack 10 is attached to the charger 40.

In S520, the battery control circuit 23 executes an initial communication process. Specifically, the battery control circuit 23 performs data communication with the charging control circuit 60, thereby recognizing attachment of the battery pack 10 to the charger 40. In S530, the battery control circuit 23 changes to a charging mode. The charging mode is a mode in which charging of the battery 20 by the charging power from the charger 40 is controlled.

In S540, the battery control circuit 23 determines whether it is possible to output the ES permission command. Specifically, the battery control circuit 23 determines whether the battery pack 10 is in the aforementioned specific faulty state. If the battery pack 10 is in the specific faulty state, then the battery control circuit 23 determines that it is impossible to output the ES permission command, and proceeds to S560. If the battery pack 10 is not in the specific faulty state, then the battery control circuit 23 determines that it is possible to output the ES permission command, and proceeds to S550. In S550, the battery control circuit 23 outputs the permission command to the ES output circuit 24. As a result, the ES permission command is outputted from the ES terminal 14.

In S560, the battery control circuit 23 receives the ES prohibition request (see S190 in FIG. 7) transmitted from the charger 40. In S570, the battery control circuit 23 outputs the prohibition command to the ES output circuit 24 in response to receiving the ES prohibition request from the charger 40, even if the battery pack 10 is not in the specific faulty state. As a result, the ES prohibition command is outputted from the ES terminal 14.

In S580, the battery control circuit 23 receives the ES permission request (see S260 in FIG. 8) transmitted from the charger 40. In S590, the battery control circuit 23 determines whether it is possible to output the ES permission command in response to receiving the ES permission request from the charger 40, similarly to S540. If it is impossible to output the ES permission command, then the present process proceeds to S610. If it is possible to output the ES permission command, then the present process proceeds to S600.

In S600, the battery control circuit 23 outputs the permission command to the ES output circuit 24. As a result, the ES permission command is outputted from the ES terminal 14. In S610, the battery control circuit 23 executes the above-described first charging control process, thereby controlling charging of the battery 20 by the charging power from the charger 40.

A supplemental description will be given of the charging system of the present embodiment. In the present embodiment, the charger 40 is able to diagnose whether data communication with the battery pack 10 can be performed properly.

Assume a situation where a faulty state that disables proper data communication between the charger 40 and the battery pack 10 is present in the charging system. In this case, the ES prohibition command may not be inputted from the battery pack 10 even if the charger 40 transmits the ES prohibition request to the battery pack 10 in S190 in FIG. 7. Also, the ES permission command may not be inputted from the battery pack 10 even if the charger 40 transmits the ES permission request to the battery pack 10 in S260 in FIG. 8.

Figure 7:
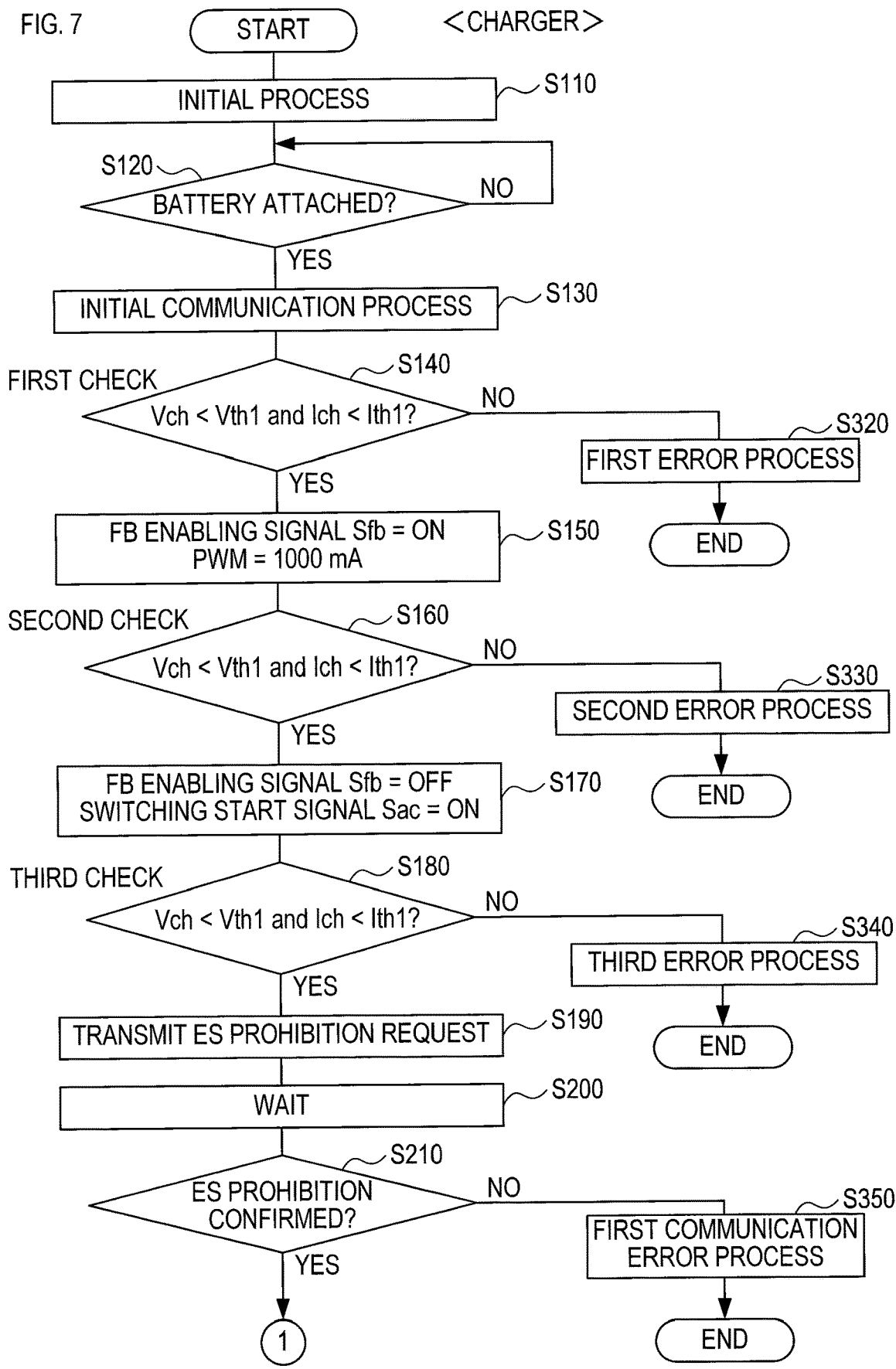
FIG. 7 is a flowchart of a part of a charger main process executed by the charger.
Figure 8:
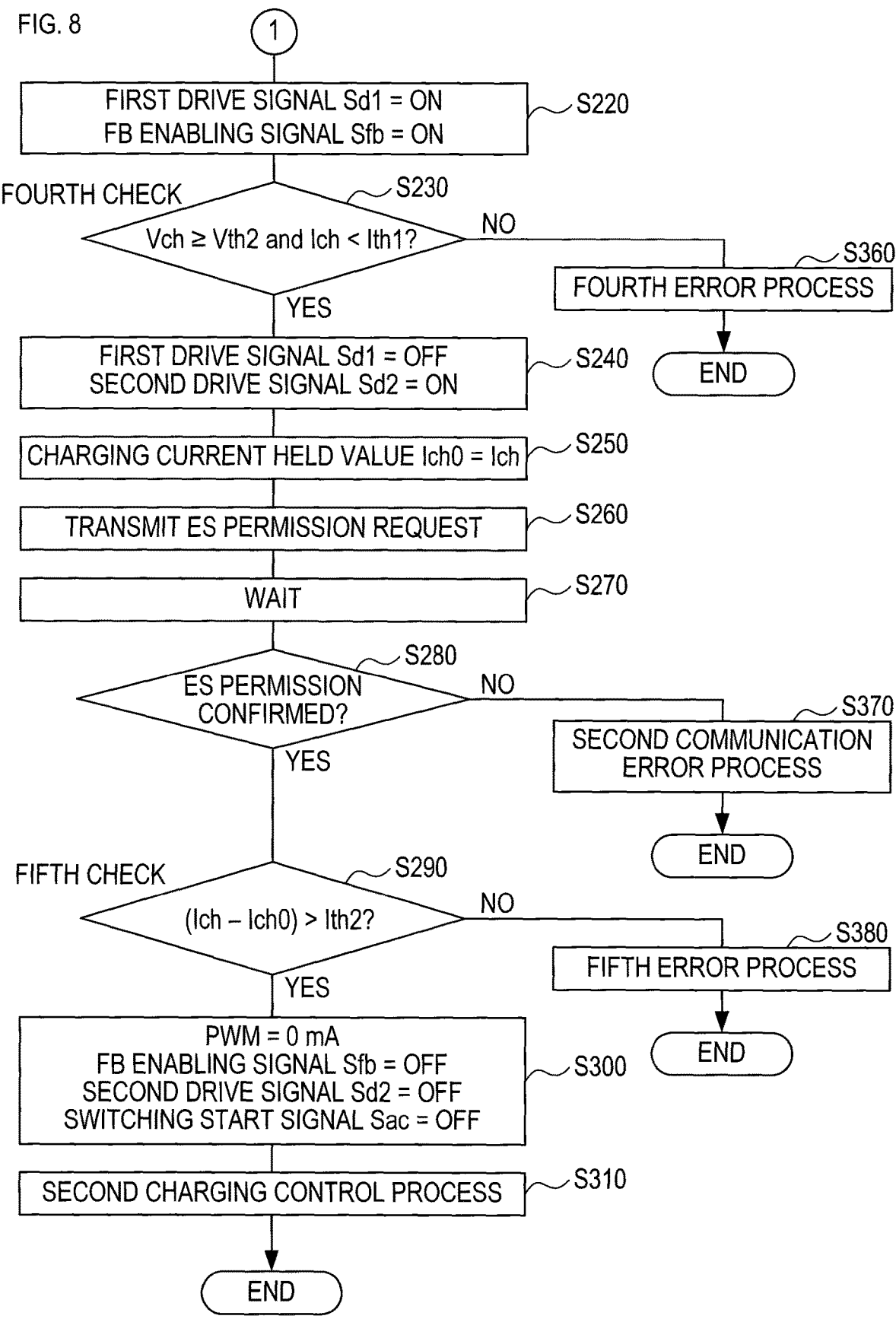
FIG. 8 is a flowchart of another part (following the part in FIG. 7) of the charger main process executed by the charger.

In the present embodiment, the charging control circuit 60 executes the first communication error process in S350 if output of the ES prohibition command from the battery pack 10 is not confirmed in S210 in FIG. 7. Also, the charging control circuit 60 executes the second communication error process in S370 if output of the ES permission command from the battery pack 10 is not confirmed in S280 in FIG. 8. Accordingly, if a faulty state in the charging system is present that disables proper data communication between the charger 40 and the battery pack 10, a user of the charger 40 can recognize the presence of the faulty state in the charging system by the first communication error process or the second communication error process.

A prior art charger allows self-diagnosis of a circuit itself as a target of diagnosis (a target circuit). However, it is assumed that, in a case where the target circuit is configured to be connected to a battery pack, it is difficult for the prior art charger to detect a faulty state (for example, disconnection) in another circuit (for example, a wiring, a connector, or the like) that connects the target circuit to a battery pack.

In contrast, the charging control circuit 60 of the present embodiment can detect a faulty state in another circuit that connects the target circuit to a battery pack 10. Specifically, for example, assuming a situation of the charger 40 where a faulty state is present in a wiring system from the ES terminal 44 through the ES input circuit 74 to the line switch circuit 58 and/or the precharging circuit 59. In this case, a proper ES signal corresponding to the ES command from the battery pack 10 may not be inputted to the line switch circuit 58 and/or the precharging circuit 59. However, even in a case of such a faulty state, the user of the charger 40 can recognize presence of the faulty state by the process of S210 or S280.

During execution of the self-diagnosis process in the charger 40, the ES command from the battery pack 10 may be unintentionally changed in response to a status change of the battery pack 10. In the present embodiment, the ES prohibition request is transmitted to the battery pack 10 (S190) before performing the fourth check based on the ES command (S230), and the ES permission request is transmitted to the battery pack 10 (S260) before performing the fifth check based on the ES command (S290). Accordingly, the charging control circuit 60 can perform each of the fourth check and the fifth check in a state where the proper ES command corresponding to a purpose of the check is inputted from the battery pack 10 to the charger 40.

The battery control circuit 23 corresponds to one example of an information output circuit in the present disclosure. The ES prohibition command corresponds to one example of faulty state information in the present disclosure, and the ES permission command corresponds to one example of non-faulty state information in the present disclosure. The main converter 54 corresponds to one example of a charging power generation circuit in the present disclosure. The line switch circuit 58 corresponds to one example of a functional circuit in the present disclosure. The ES prohibition request corresponds to one example of an faulty state information request in the present disclosure, and the ES permission request corresponds to a removing request in the present disclosure. The positive electrode line 55 corresponds to one example of an electric power path in the present disclosure.

The switching elements T01, T02 correspond to one example of a switch circuit in the present disclosure. The precharging circuit 59 corresponds to one example of a separate functional circuit, a precharging circuit, and a second forcible interruption circuit in the present disclosure. The forcible interruption circuit 58b corresponds to one example of a first forcible interruption circuit in the present disclosure. The forcible interruption circuit 59b corresponds to one example of a second forcible interruption circuit in the present disclosure. The ES input circuit 74 corresponds to one example of a reception circuit in the present disclosure. The specific faulty state corresponds to one example of a first faulty state.

A process in S190 corresponds to one example of a faulty state information request process in the present disclosure. A process in S210 corresponds to one example of a faulty state information confirmation process. A process in S230 corresponds to one example of an operation information acquisition process and a first diagnosis process in the present disclosure. A process in S350 corresponds to one example of a communication error process in the present disclosure. Each of processes in S140, S160, and S180, that is, the first check, the second check, and the third check, corresponds to one example of a second diagnosis process in the present disclosure. A process in S260 corresponds to one example of a removing request process in the present disclosure. A process in S290 corresponds to one example of a third diagnosis process in the present disclosure.

Other Embodiments

Although one embodiment of the present disclosure has been described above, the present disclosure is not limited to the above-described embodiment, but may be practiced in various modified forms.

(1) In the above-described embodiment, targets of the fourth check and the fifth check are the line switch circuit 58 and the precharging circuit 59. However, the target may be the line switch circuit 58 or the precharging circuit 59. The target may include a circuit other than the line switch circuit 58 and the precharging circuit 59.

(2) The charging control circuit 60 may perform the fourth check, similarly to the fifth check, based on the current deviation. The charging control circuit 60 may perform the fifth check, similarly to the fourth check, based on the charging current value Ich and the charging voltage value Vch. The charging control circuit 60 may also perform the fifth check based only on either the charging current value Ich or the charging voltage value Vch.

(3) In the above-described embodiment, a requirement for determining the result of the first check as being normal is that the following two conditions are simultaneously satisfied: a condition that the charging voltage value Vch is less than the first voltage threshold Vth1 and a condition that the charging current value Ich is less than the first current threshold Ith1. However, the result of the first check may be determined as being normal if at least one of the aforementioned two conditions is satisfied. For example, in the first check, the result may be determined as being normal if the charging voltage value Vch is less than the first voltage threshold Vth, without performing a determination based on the charging current value Ich. The same is applicable to the second check, the third check, and the fourth check.

(4) In the above-described embodiment, five checks (the first check to the fifth check) are performed in the self-diagnosis process; however, four or less checks, or six or more checks may be performed. Also, any kind of check may be performed in each of these checks.

(5) In the above-described embodiment, the self-diagnosis process is executed after the battery pack 10 is attached to the charger 40 and before charging of the battery 20 is started; however, the self-diagnosis process may be executed at any time point. Also, the self-diagnosis process may be executed two or more times while the battery pack 10 is attached to the charger 40.

(6) In the above-described embodiment, if the result of any check is determined as being improper in the self-diagnosis process, the corresponding error process is executed without performing any subsequent checks, as described with reference to FIG. 7 and FIG. 8. However, regardless of each check result, all the checks (the first check to the fifth check in the above-described embodiment) may be performed.

(7) A plurality of functions performed by a single element in the above-described embodiment may be achieved by a plurality of elements, or a function performed by a single element may be achieved by a plurality of elements. Also, a plurality of functions performed by a plurality of elements may be achieved by a single element, or a function performed by a plurality of elements may be achieved by a single element. Further, a part of a configuration in the above-described embodiment may be omitted. Moreover, at least a part of a configuration in the above-described embodiment may be added to, or may replace, another configuration in the above-described embodiment.

What is claimed is:

1. A charging system comprising:
 a charger including:
  a charging power generation circuit configured to generate charging power;
  a reception circuit configured to receive faulty state information and non-faulty state information;
  a functional circuit configured to:
   perform a first function in response to the reception circuit receiving the non-faulty state information; and
   perform a second function in response to the reception circuit receiving the faulty state information;
  a separate functional circuit configured to:
   perform a fourth function in response to the reception circuit receiving the non-faulty state information; and
   perform a fifth function in response to the reception circuit receiving the faulty state information, the fifth function being different from the fourth function; and
  a charging control circuit separately provided from the functional circuit, the charging control circuit being configured to:
   transmit a faulty state information request in response to the reception circuit receiving the non-faulty state information; and
   execute a third diagnosis process of diagnosing whether the separate functional circuit operates properly by comparing a first operation state of the separate functional circuit in the charger that receives the non-faulty state information, with a second operation state of the separate functional circuit in the charger that receives the faulty state information transmitted in response to the faulty state information request; and
 a battery pack configured to be detachably attached to an electric working machine, the charger being configured such that the battery pack is detachably attached to the charger, the battery pack including:
a battery configured to be charged with charging power supplied from the charger; and
an information output circuit configured to:
  output the faulty state information indicating that the battery pack is in a first faulty state, in response to the battery pack being in the first faulty state;
  output the faulty state information in response to (i) the battery pack not being in the first faulty state, and also (ii) the information output circuit receiving the faulty state information request requesting the battery pack to output the faulty state information; and
  output the non-faulty state information indicating that the battery pack is not in the first faulty state, in response to the battery pack not being in the first faulty state.

2. The charging system according to claim 1,
wherein the separate functional circuit includes:
  a precharging circuit configured to receive the charging power, the precharging circuit being configured to output precharging power in response to receiving a second drive signal, the precharging power corresponding to the charging power that is limited within a preset range; and
  a second forcible interruption circuit configured to permit operation of the precharging circuit in response to the reception circuit receiving the non-faulty state information, the second forcible interruption circuit being configured to disable the second drive signal to thereby stop output of the precharging power from the precharging circuit in response to the reception circuit receiving the faulty state information, and
wherein the battery is configured to be charged with the precharging power supplied from the charger.

3. The charging system according to claim 2,
wherein the charging control circuit is configured to output the second drive signal in response to the reception circuit receiving the non-faulty state information, and
wherein the charging control circuit is configured to stop output of the second drive signal in response to the reception circuit receiving the faulty state information.

4. A battery pack comprising:
a terminal configured to be selectively connected to one of an electric working machine and a charger;
a battery configured to be charged with charging power supplied from the charger; and
an information output circuit including:
  a battery control circuit configured to:
    output a first command indicating that the battery pack is in a first faulty state, in response to the battery pack being in the first faulty state;
    output a second command indicating that the battery pack is not in the first faulty state, in response to the battery pack not being in the first faulty state; and
    output the first command in response to (i) the battery pack not being in the first faulty state, and also (ii) the information output circuit receiving a faulty state information request from the charger, the faulty state information request requesting the battery pack to output the faulty state information indicating that the battery pack is in the first faulty state; and
  an output circuit connected to the battery control circuit and to the terminal, the output circuit being configured to:
    receive the first command and the second command from the battery control circuit;
    set an input impedance of the terminal to a first impedance to thereby output the faulty state information to the terminal, in response to the output circuit receiving the first command; and
    set the input impedance of the terminal to a second impedance to thereby output to the terminal non-faulty state information indicating that the battery pack is not in the first faulty state, in response to the output circuit receiving the second command, the second impedance being different from the first impedance.

* * * * *